(12) United States Patent
Colclasure et al.

(10) Patent No.: US 9,130,952 B2
(45) Date of Patent: *Sep. 8, 2015

(54) METHOD AND APPARATUS FOR SEARCHING METADATA

(71) Applicant: Apple Inc., Cupertino, CA (US)

(72) Inventors: Kaelin Lee Colclasure, Sunnyvale, CA (US); Ruxton J. Tucker, Pleasanton, CA (US); Bradley R M Suinn, Fort Collins, CO (US); John Martin Hornkvist, Cupertino, CA (US); Yan Arrouye, Mountain View, CA (US); Brent Callaghan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,726

(22) Filed: Feb. 6, 2014

(65) Prior Publication Data

US 2014/0189844 A1 Jul. 3, 2014

Related U.S. Application Data

(60) Continuation of application No. 13/455,534, filed on Apr. 25, 2012, now Pat. No. 8,688,745, which is a division of application No. 12/468,828, filed on May 19, 2009, now Pat. No. 8,171,042, which is a division of application No. 11/499,267, filed on Aug. 4, 2006, now Pat. No. 7,536,383.

(51) Int. Cl.
*G06F 17/30* (2006.01)
*G06F 7/00* (2006.01)
*H04L 29/06* (2006.01)

(52) U.S. Cl.
CPC .............. *H04L 63/10* (2013.01); *G06F 17/301* (2013.01); *G06F 17/30442* (2013.01); *G06F 17/30997* (2013.01); *Y10S 707/99934* (2013.01)

(58) Field of Classification Search
USPC ......................................... 707/802, 765, 769
See application file for complete search history.

(56) References Cited

U.S. PATENT DOCUMENTS

| | | | |
|---|---|---|---|
| 5,590,314 A * | 12/1996 | Ueno et al. ..................... | 719/321 |
| 5,721,904 A * | 2/1998 | Ito et al. ......................... | 707/769 |
| 5,926,809 A | 7/1999 | Szalwinski | |
| 6,173,374 B1 * | 1/2001 | Heil et al. ...................... | 711/148 |
| 6,374,236 B1 | 4/2002 | Chen et al. | |
| 6,961,726 B1 * | 11/2005 | Eisenberg et al. .................... | 1/1 |
| 7,130,838 B2 | 10/2006 | Barsness et al. | |
| 7,143,132 B2 * | 11/2006 | Klein et al. ................... | 709/203 |
| 7,299,220 B2 * | 11/2007 | Chaudhuri et al. ................... | 1/1 |
| 2002/0049749 A1 * | 4/2002 | Helgeson et al. ................. | 707/3 |
| 2003/0023607 A1 | 1/2003 | Phelan et al. | |
| 2003/0063771 A1 * | 4/2003 | Morris et al. ................. | 382/100 |
| 2003/0074352 A1 | 4/2003 | Raboczi et al. | |

(Continued)

*Primary Examiner* — Kuen Lu
(74) *Attorney, Agent, or Firm* — Blakely, Sokoloff, Taylor & Zafman LLP

(57) ABSTRACT

Methods and apparatuses for searching metadata are described herein. In one embodiment, an example of a process for search metadata includes, hut is not limited to, in response to a search query for metadata stored in one or more of metadata stores, the search query is partitioned into multiple search query segments. Thereafter, searches corresponding to the search query segments are performed, where each search is performed independently within the one or more metadata stores. Other methods and apparatuses are also described.

24 Claims, 17 Drawing Sheets

(56) References Cited

U.S. PATENT DOCUMENTS

| | | |
|---|---|---|
| 2004/0243595 A1 | 12/2004 | Cui et al. |
| 2005/0097099 A1 | 5/2005 | Kapoor et al. |
| 2006/0008256 A1* | 1/2006 | Khedouri et al. ............. 386/124 |
| 2006/0074848 A1* | 4/2006 | Lee et al. ........................ 707/1 |
| 2006/0112188 A1* | 5/2006 | Albanese et al. ............. 709/238 |
| 2006/0218123 A1 | 9/2006 | Chowdhuri et al. |
| 2006/0266826 A1 | 11/2006 | Banfield et al. |
| 2007/0016558 A1* | 1/2007 | Bestgen et al. ................... 707/3 |
| 2007/0179999 A1* | 8/2007 | Kamei et al. ................. 707/204 |

* cited by examiner

METHOD AND APPARATUS FOR SEARCHING METADATA

This application is a continuation of co-pending U.S. patent application Ser. No. 13/455,534, filed on Apr. 25, 2012, which is a divisional of U.S. patent application Ser. No. 12/468,828, filed on May 19, 2009, now issued as U.S. Pat. No. 8,171,042, which is a divisional of U.S. patent application Ser. No. 11/499,267, filed on Aug. 4, 2006, now issued as U.S. Pat. No. 7,536,383.

FIELD OF THE INVENTION

The present invention relates generally to data processing. More particularly, this invention relates to processing metadata.

BACKGROUND

Modern data processing systems, such as general purpose computer systems, allow the users of such systems to create a variety of different types of data files. For example, a typical user of a data processing system may create text files with a word processing program such as Microsoft Word or may create an image file with an image processing program such as Adobe's PhotoShop. Several other types of files can be created or modified, edited, and otherwise utilized by one or more users, for a typical data processing system. The wide array of files that can be created or modified may present a challenge to a typical user who is seeking to find a particular file which has been created.

Modern data processing systems often include a file management system which allows a user to place files in various directories or subdirectories (e.g. folders) and allows a user to give the file a name. Further, these file management systems often allow a user to find a file by searching for the file's name, or the date of creation, or the date of modification, or the type of file. An example of such a file management system is the Finder program which operates on Macintosh computers from Apple Computer, Inc. of Cupertino, Calif. Another example of a file management system program is the Windows Explorer program which operates on the Windows operating system from Microsoft Corporation of Redmond, Wash.

Both the Finder program and the Windows Explorer program include a find command which allows a user to search for files by various criteria including a file name or a date of creation or a date of modification or the type of file. However, this search capability searches through information which is the same for each file, regardless of the type of file. Thus, for example, the searchable data for a Microsoft Word file is the same as the searchable data for an Adobe PhotoShop file, and this data typically includes the file name, the type of file, the date of creation, the date of last modification, the size of the file and certain other parameters which may be maintained for the file by the file management system.

Certain presently existing application programs allow a user to maintain data about a particular file. This data about a particular file may be considered metadata because it is data about other data. This metadata for a particular file may include information about the author of a file, a summary of the document, and various other types of information. A program such as Microsoft Word may automatically create some of this data when a user creates a file and the user may add additional data or edit the data by selecting the "property sheet" from a menu selection in Microsoft Word. The property sheets in Microsoft Word allow a user to create metadata for a particular file or document.

Recently, metadata stored in a database may be searched using a metadata search engine. Typically, a search for metadata is conducted while a storage volume for metadata is locked to prevent other applications from accessing the same storage area. For example, a word processor may write to a file which may update the metadata associated with the file. Meanwhile, a searching application (e.g., Finder) may substantially concurrently access the metadata. As a result, one of the applications is blocked while the other is accessing the metadata. Often, such search operations are inefficient.

SUMMARY OF THE DESCRIPTION

Methods and apparatuses for searching metadata are described herein. In one aspect of the invention, an example of a process for search metadata includes, but is not limited to, in response to a search query for metadata stored in one or more of metadata stores, the search query is partitioned into multiple search query segments. Thereafter, searches corresponding to the search query segments are performed, where each search is performed independently within the one or more metadata stores.

According to another aspect of the invention, an exemplary process includes, in response to a first search query for searching metadata, partitioning the first search query into multiple first search query segments, and in response to a second search query for searching metadata, partitioning the second search query into multiple second search query segments. Then the first and second search query segments are grouped into one or more bundles, at least one bundle having at least one first search query segment and at least one second search query segment and search query segments within a bundle having similar characteristics. Thereafter a search is conducted on a per bundle basis.

According to a further aspect of the invention, in response to a request to access metadata stored in a remote storage volume of a remote server mounted using a network file accessing protocol, a communication channel over the network accessing protocol is establish to dedicatedly' access the requested metadata stored in the remote storage. The communications using the communication channel are performed in parallel with normal traffic with the remote server using regular communications over the network file accessing protocol.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Methods and apparatuses for searching metadata are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the spec cation to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a search query or request for metadata may be partitioned into multiple search query segments or sub-requests, where a search for each search query segment may be independently scheduled, for example, in a round robin fashion. As a result, a metadata store or a storage volume does not have to be locked for an extended period of time. In addition, searches for multiple search query segments may be conducted using multi-threading techniques which may further improve the search efficiency. Furthermore, a remote MDS in a peer-to-peer network configuration (e.g., MDS peers) may be accessed via a channel or tunnel on the top of network file access protocols for the purposes of accessing metadata of a remote system.

Embodiments of Metadata Processing Systems

Figure 1:
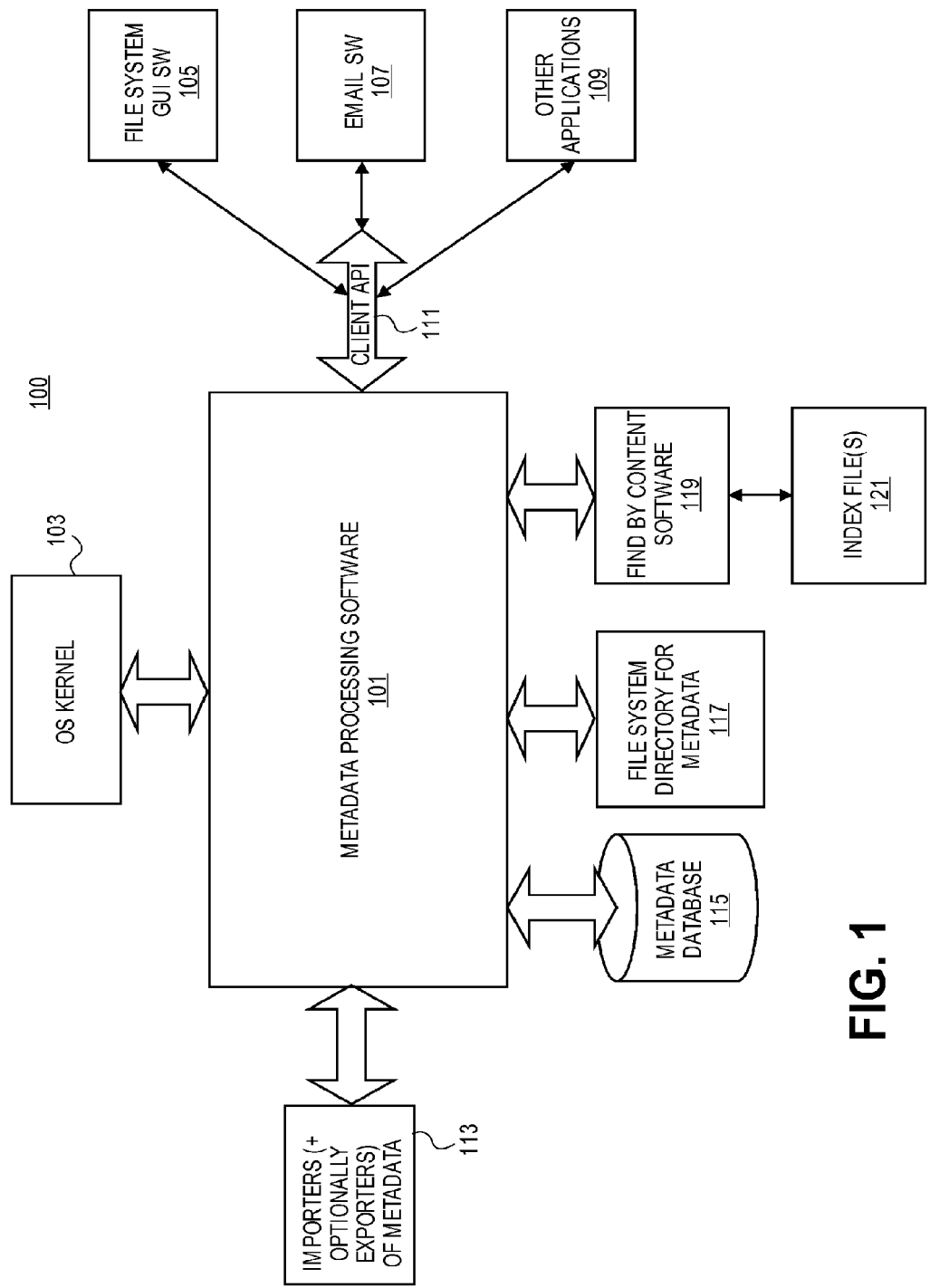
FIG. 1 is a block diagram illustrating an example of architecture for processing metadata which may be used with one embodiment of the invention.

FIG. 1 is a block diagram illustrating an example of architecture for processing metadata which may be used with one embodiment of the invention. Note that various different software architectures may be used to implement the functions and operations described herein. The following discussion provides one example of such an architecture, but it will be understood that alternative architectures may also be employed to achieve the same or similar results. The software architecture shown in FIG. 1 is an example which is based upon the Macintosh operating system.

Referring to FIG. 1, according to one embodiment, architecture 100 includes a metadata processing software 101 and an operating system (OS) kernel 103 which is operatively coupled to the metadata processing software 101 for a notification mechanism. The metadata processing software 101 is also coupled to other software programs such as a file system graphical user interface software 105 (which may be the Finder), an email software 107, and other applications 109. These applications are coupled to the metadata processing software 101 through client application program interface 111 which provide a method for transferring data and commands between the metadata processing software 101 and the software 105, 107, and 109. These commands and data may include search parameters specified by a user as well as commands to perform searches from the user, which parameters and commands (e.g., search terms or search scope) are passed to the metadata processing software 101 through the interface 111.

The metadata processing software 101 is also coupled to a collection of importers 113 which extract data from various applications. In particular, in one exemplary embodiment, a text importer is used to extract text and other information from word processing or text processing files created by word processing programs such as Microsoft Word, etc. his extracted information is the metadata for a particular file. Other types of importers extract metadata from other types of files, such as image files or music files. In this particular embodiment, a particular importer is selected based upon the type of file which has been created and modified by an application program.

For example, if the data file was created by PhotoShop, then an image importer for PhotoShop may be used to input the metadata from a PhotoShop data file into the metadata database 115 through the metadata processing software 101. On the other hand, if the data file is a word processing document, then an importer designed to extract metadata form a word processing document is called upon to extract the metadata from the word processing data file and place it into the metadata database 115 through the metadata processing software 101. Typically, different importers may be required in order to handle multiple different application programs which are used in a typical computer system. The importers 113 may optionally include multiple exporters which are capable of exporting the extracted metadata for particular types of data files back to property sheets or other data components maintained by certain application programs. For example, certain application programs may maintain some metadata for each data file created by the program, but this metadata is only a subset of the metadata extracted by an importer from this type of data file. In this instance, the exporter may export back additional metadata or may simply insert metadata into blank fields of metadata maintained by the application program.

The software architecture 100 also includes a file system directory 117 for the metadata. This file system directory keeps track of the relationship between the data files and their metadata and keeps track of the location of the metadata object (e.g. a metadata file which corresponds to the data file from which it was extracted) created by each importer. In one exemplary embodiment, the metadata database is maintained as a flat file format as described below, and the file system directory 117 maintains this flat file format. One advantage of a flat file format is that the data is laid out on a storage device as a string of data without references between fields from one metadata file (corresponding to a particular data file) to another metadata file (corresponding to another data file). This arrangement of data will often result in faster retrieval of information from the metadata database 115.

The software architecture 100 of FIG. 1 also includes find by content software 119 which is operatively coupled to a database 121 which includes an index of files. The index of files represents at least a subset of the data files in a storage device and may include all of the data files in a particular storage device (or several storage devices), such as the main hard drive of a computer system. The index of files may be a conventional indexed representation of the content of each document. The find by content software 119 searches for words in that content by searching through the database 121 to see if a particular word exists in any of the data files which have been indexed. The find by content software functionality is available through the metadata processing software 101 which provides the advantage to the user that the user can search concurrently both the index of files in the database 121 (for the content within a file) as well as the metadata for the various data files being searched.

In addition, according to certain embodiments of the invention, metadata processing software 101 may further include a metadata search processing unit (not shown), in response to a search request for searching metadata, to partition the search request into multiple search sub-requests, where each search sub-request can be independently scheduled or performed in a search for metadata stored in a metadata store, which may be stored in the metadata database 115. For example, according to one embodiment, a search query may include multiple terms and some of those terms may be stored in different metadata stores or databases, which may be located locally or remotely over a network. The search query may be divided into multiple sub-queries, each corresponding to one or more search terms. The searches for the sub-queries may be scheduled and performed independently over multiple metadata stores. Alternatively, a search query may be divided according to the geographical locations of the metadata stores (e.g., local vs. remote locations). Furthermore, metadata stored in a remote or distant store may be accessed via a dedicated communication channel or tunnel. For example, a remote store may be mounted as a network drive (e.g., a shared drive) using a network file access protocol. A communication channel may be established over the network file access protocol to specifically access metadata stored in the mounted remote store. As a result, metadata may be accessed in parallel with regular content access via the network file access protocol. Further, certain clients may only be able to access certain metadata stored in a metadata store based on the permissions or privileges of the clients. Furthermore, a metadata store may be a third-party metadata store which may be accessed using a plug-in interface. Further detailed information regarding these features may be found in a co-pending U.S. patent application Ser. No. 11/499,335, entitled "Method and Apparatus for Processing Metadata", filed Aug. 4, 2006, attorney docket No. 4860.P4472, which is incorporated by reference herein in its entirety. Other configurations may exist.

Figure 2:
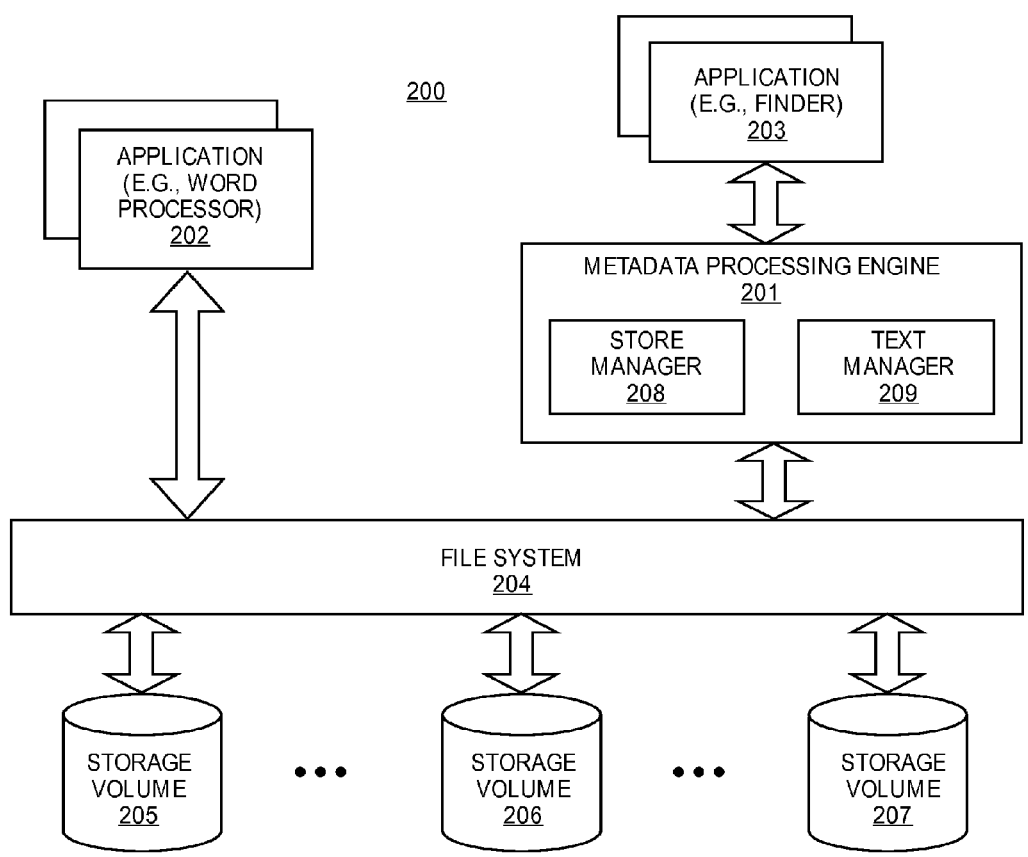
FIG. 2 is a block diagram illustrating an exemplary system for processing metadata according to one embodiment of the invention.

FIG. 2 is a block diagram illustrating an exemplary system for processing metadata according to one embodiment of the invention. For example, system 200 may be implemented as a part of a metadata server (MDS) for providing services to access metadata. In one embodiment, system 200 includes a metadata processing engine 201 for processing metadata requests, such as, for example, metadata search requests, from a variety of applications 203, such as, for example, a search application, similar to Finder available from Apple Computer of Cupertino, Calif. In one embodiment, metadata processing engine 201 may be implemented as part of metadata processing software 101 of FIG. 1. However, metadata processing engine 201 may be implemented in software, hardware, or a combination of both.

In addition, system 200 includes a file system and/or file system API (application programming interface) to allow metadata processing engine 201, as well as other applications 202, to access content stored in one or more storage volumes 205-207. Content stored in the storage volumes 205-207 may include content files, metadata, and indexes (e.g., content indexes and/or metadata indexes) associated with these data. For example, some or all of the storage volumes 205-207 may be implemented as part of metadata database 115, file system directory for metadata, and/or index file(s) 121 as shown in FIG. 1.

In one embodiment, metadata processing engine 201 includes a task manager 209, in response to a search query for metadata stored in one or more of metadata stores, configured to partition the search query into multiple search query segments, and a search engine (not shown) coupled to the task manager 209 to perform searches corresponding to the search query segments, where each search is performed independently the one or more metadata stores, which may reside in some or all of the storage volumes 205-207.

The storage volumes 205-207 may be local storage volumes or remote storage volumes, and they may be partitioned in different logical and/or physical storage disks. Any of the storage volumes 205-207 may be located remotely over a network, where metadata stored therein may be accessed via a specific communication channel or tunnel over a network file access protocol. The storage volumes 205-207 may be managed by a volume manager (not shown) A volume manager is responsible for monitoring, instantiating, and/or destroying store instances as volumes are mounted and dismounted respectively. A volume manager may be instantiated during the startup time of the system 200 and may be destroyed when system 200 is shut down.

The metadata processing engine 201 further includes a store manager 208 to manage the metadata stores in the storage volumes 205-207. Store manager 208 is responsible for maintaining a mapping of scopes to store instances of other components. A store is a data structure representing a storage volume or segment of a storage disk, for example, for storing metadata. When a store is instantiated, for example, by a volume manager, the store registers itself with store manager 208. Store manager 208 queries the registering store's properties to determine certain characteristics or attributes of the registering store, such as, for example, file system scopes and/or metadata scopes (also referred to as meta-scopes) that the registering store services. In one embodiment, store manager 208 may be instantiated during a startup time (e.g., initialization period) of system 200, and store manager 208 may be destroyed when system 200 is shut down.

As described above, in response to a search query for searching metadata, task manager 209 partitions the search query into multiple search query segments. In one embodiment, the task manager 209 may communicate with store manager 208 to determine which of the stores should be searched, for example, based on a layout of the metadata stores. In a particular embodiment, a search query may be divided based on whether a particular metadata store being searched is a local store versus a distant store (e.g., remote store). For example, a search query may be divided based on the search terms of the search query and based on whether a metadata store being searched is located in a local hard drive, a remote storage over a network, and/or a removable media, etc. In case of a network drive, the search query may be partitioned based on whether such a network drive is a LAN (local area network) drive or a WAN (wide area network, such as the Internet) drive, etc. Further, a search query may be partitioned based on a scope (e.g., meta-scope or scopes) of the search query (e.g., whether such a request is within a local or distant scope specified by a client).

Each partitioned search query segment is scheduled in an independent search within one or more of metadata stores residing in some or all of the storage volumes 205-207. Since a search query has been broken down into pieces and each piece is scheduled independently (e.g., individual thread), this virtually eliminates or reduces the need to lock a particular volume while the search is being conducted. That is, since the search area involved in each search of a partitioned piece is reduced significantly, the chances that applications 203 and applications 202 are accessing the same storage area or an overlapped area are relatively small. As a result, both applications 202 and 203 can substantially concurrently access contents stored in storage volumes 205-207 without blocking each other. Further, the broken-down pieces of searches may be scheduled using multi-threading technologies, particularly, in a system having multiple processors or multiple core logics (e.g., logical processors), such that multiple searches for the broken-down pieces can be conducted substantially simultaneously. As a result, the searching efficiency may be greatly improved.

Note that, through out this application, the techniques described herein are applied to searching for metadata as an example for the purposes of illustration only. It will be appreciated that the techniques described throughout this application can also be applied to other types of data.

Embodiment of Metadata Accesses Segmentation of Queries

Figure 3:
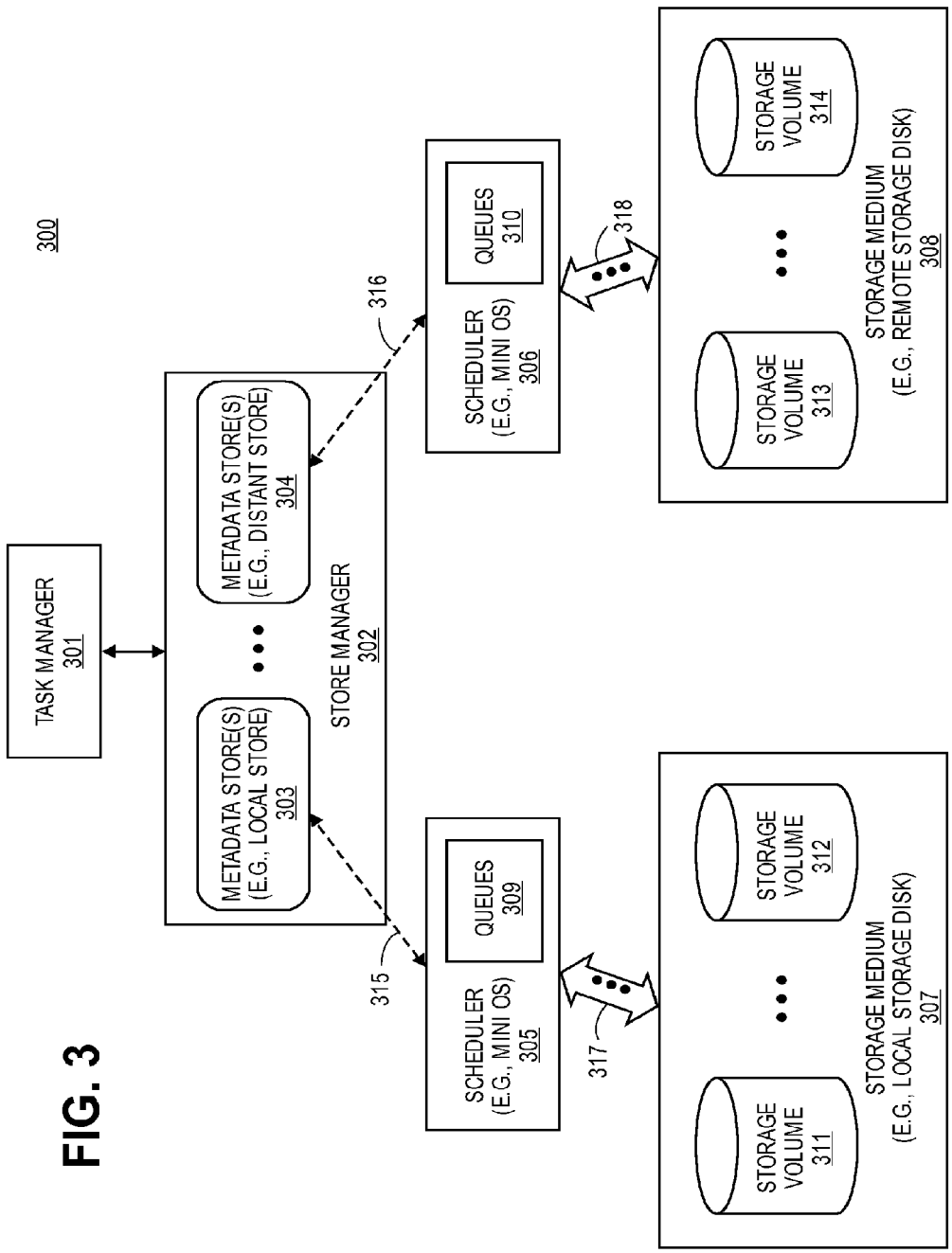
FIG. 3 is a block diagram illustrating an exemplary system for processing metadata according to one embodiment of the invention.

FIG. 3 is a block diagram illustrating an exemplary system for processing metadata according to one embodiment of the invention. For example, system 300 may be an exemplary architectural design for systems 100 of FIG. 1 and/or system 200 of FIG. 2 for the purposes of illustration. In one embodiment, exemplary system 300 includes, but is not limited to, a task manager, in response to a search query for metadata stored in one or more of multiple metadata stores, configured to partition the search query into multiple search query segments, and a search engine coupled to the task manager to perform searches corresponding to the search query segments, where each search is performed independently within the one or more metadata stores.

Referring to FIG. 3, system 300 includes a task manager 301 communicatively coupled to a store manager 302 for managing one or more metadata stores 303-304, which may be stored in one or more storage medium or disks 307-308. Storage medium 307-308 may include one or more storage volumes 311-314, logically or physically. Storage volumes 311-314 may be implemented as part of storage volumes 205-207 of FIG. 2.

Such storage volumes may reside locally or remotely over a network (e.g., LAN or WAN). In this example, for the purposes of illustration, metadata store 303 is a local store while metadata store 304 is a distant store which is remotely located over a network. Storage volumes 313-314 may be mounted as a network drive using a variety of network file access protocols. In addition, metadata stored in storage volumes 313-314 may be accessed using a dedicated communication channel or tunnel on the top of the network access protocol, which will be described in details further below.

Task manager 301 may be implemented as part of task manager 209 of FIG. 2. Likewise, store manager 302 may be implemented as part of store manager 208 of FIG. 2. As described above, in response to a search request, task manager 301 communicates with store manager 302 to determine which of the metadata stores 303-304 should be searched. Based on the store configuration information and the information associated with the search request (e.g., search terms, etc.), as well as other related information, the task manager 301 partitions the search request info multiple sub-requests, where each sub-request can be independently scheduled by a scheduler, such as schedulers 305-306. Note that a search may be conducted in multiple stores. Similarly, a storage volume (e.g., storage volumes 311-312) and/or storage disk (e.g., storage disk 307) may include multiple stores. After all searches for all search segments have been completed, the corresponding search results may be integrated back together to form a final search result to be returned to the client.

Figure 4:
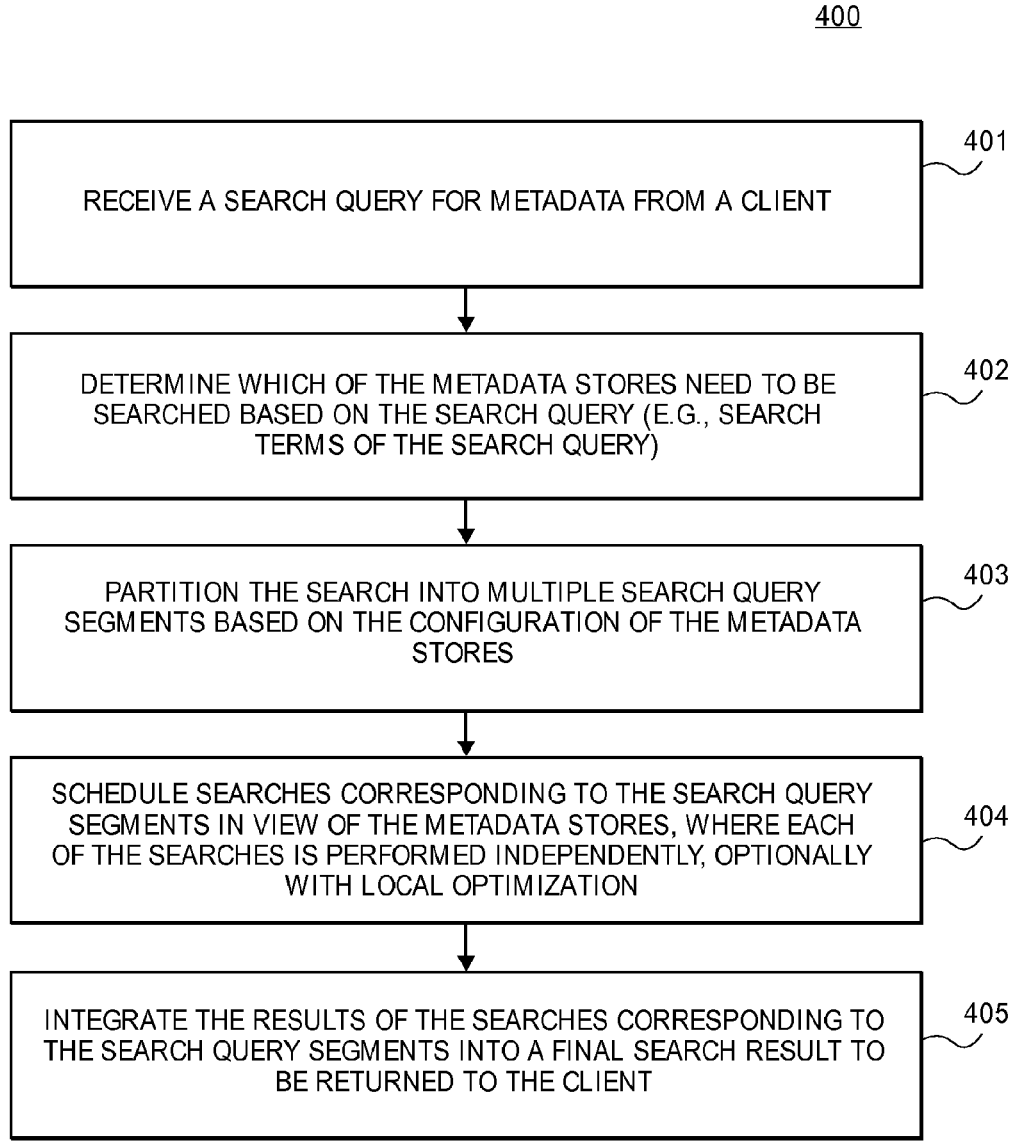
FIG. 4 is a flow diagram illustrating an exemplary process for processing metadata according to one embodiment of the invention.

FIG. 4 is a flow diagram illustrating an exemplary process for processing metadata according to one embodiment of the invention. Note that process 400 may be performed by a processing logic, which may include software, hardware, or a combination of both. For example, process 400 may be performed by metadata processing engine 201 of FIG. 2 or system 300 of FIG. 3. In one embodiment, exemplary process 400 includes, but is not limited to, in response to a search query for metadata stored in one or more of metadata stores, partitioning the search query into multiple search query segments, and performing searches corresponding to the search query segments, each search being performed independently within the one or more metadata stores.

Referring to FIG. 4, at block 401, a search query is received for searching metadata. At block 402, processing logic determines which of the metadata stores need to be searched based on the search query (e.g., search terms) and the configuration of metadata stores. In one embodiment, such a determination is performed by a store manager managing the metadata stores, such as store manager 302 of FIG. 3. In response to the determination, processing logic partitions the search query into multiple segments. In one embodiment, the partition may be performed by a task manager, such as task manager 301 of FIG. 3, using the information received from the store manager. At block 404, searches corresponding to the multiple segments are scheduled independently with optional local optimization. In one embodiment, such scheduling operations may be performed by a scheduler, such as scheduler 305 of FIG. 3 corresponding to the storage volume/disk being searched. Thereafter, at block 405, the search results of the segments are integrated to form a final search result to be returned to the client originating the search query.

In one embodiment, referring back to FIG. 3, for each storage disk, a system thread (e.g., an OS thread) is allocated to handle substantially all searches conducted within the respective storage disk. In this example, referring to FIG. 3, for store or stores 303, system 300 allocates a system thread 315 to handle substantially all searches related to storage disk 307. Likewise, for store or stores 304, system 300 allocates a system thread 316 to handle substantially all searches related to storage disk 308.

In one embodiment, for each system thread, a scheduler is configured to schedule all searches for all search query segments segmented or partitioned by the task manager 301 and/or store manager 302, which may be implemented in separate functional units or a single unit such that each of the searches can be conducted independently. In one particular embodiment, a scheduler schedules a process for each search in a time sharing manner within the associated system thread, where each process is associated with a time slice having a predetermined period of time of the system thread. In one embodiment, the time-slice processes are executed in a round robin fashion. A scheduler may be implemented having certain functionalities of an operating system (OS), such as, for example, resource management and scheduling capabilities, similar to a mini OS.

For example, if the execution of a process corresponding to a search is time up while the search has not been completed, the operating states or status of the search, as well as the partial search result may be stored in a queue associated with the search and the current search is suspended. A search for next time slice is executed while the current search is put on-hold. After all other time-sliced searches have been conducted within the respective time slices, the suspended current search is "picked up" again and the previously suspended search is continued using the previously saved operating states and the partial search results.

In this example, referring to FIG. 3, for all searches associated with search query segments which divided from one or more search queries, scheduler 305 schedules processes 317 within the allocated system thread 315, each process corresponding to a search. As described above, processes 317 may be time-sharing processes sharing the time of system thread 315 (e.g., time sliced where each time slice has a predetermined period of time). Each process is executed during the corresponding time slice. At the end of each time slice, if the corresponding search has not been completed, the operating states or statuses of the search, as well as a partial search result may be stored in one of the queues 309 managed by scheduler 305. As a result, an incomplete search may be "picked up" again and continue upon next corresponding time slice. Queues 309 includes multiple queues, each corresponding to a time sliced process 317. Similarly, scheduler 306 is configured to schedule processes 318 within the corresponding system thread 316 for searches conducted within storage disk 308.

Note that for the purposes of illustration, a system thread (e.g., system thread 315) is allocated for each physical storage disk (e.g., storage disk 307). However, other configurations may also be implemented. For example, a system thread may be allocated on a per store basis, a storage volume basis, and/or a unique search term basis, etc. In addition, remote or distant storage medium 308 may be located remotely over a network, such as, for example, a remote file server or a peer system.

Further, scheduler 305 may be associated with the storage medium 307 or may be associated with the task manager 301 and/or store manager 302. In the case of distant store 304, scheduler 306 may be located locally and associated with the task manager 301 and/or store manager 302. Alternatively, scheduler 306 may be located remotely and associated with storage medium 308.

The remote storage medium or disk 308 may be mounted and/or accessed via certain network file system protocols. Alternatively, such remote storage may be accessed using some tunneling protocols. The remote storage may be a third party storage system communicatively coupled to local system 300, for example, via a plug-in interface.

Note that, although the task manager 301, store manager 302, and schedulers 305-306 are described as separate units; however, these components may be implemented in more or fewer units, and they may be implemented in software, hardware, or a combination of both. Other configuration apparent to these with ordinary skill in the arts may also be implemented.

Figure 5:
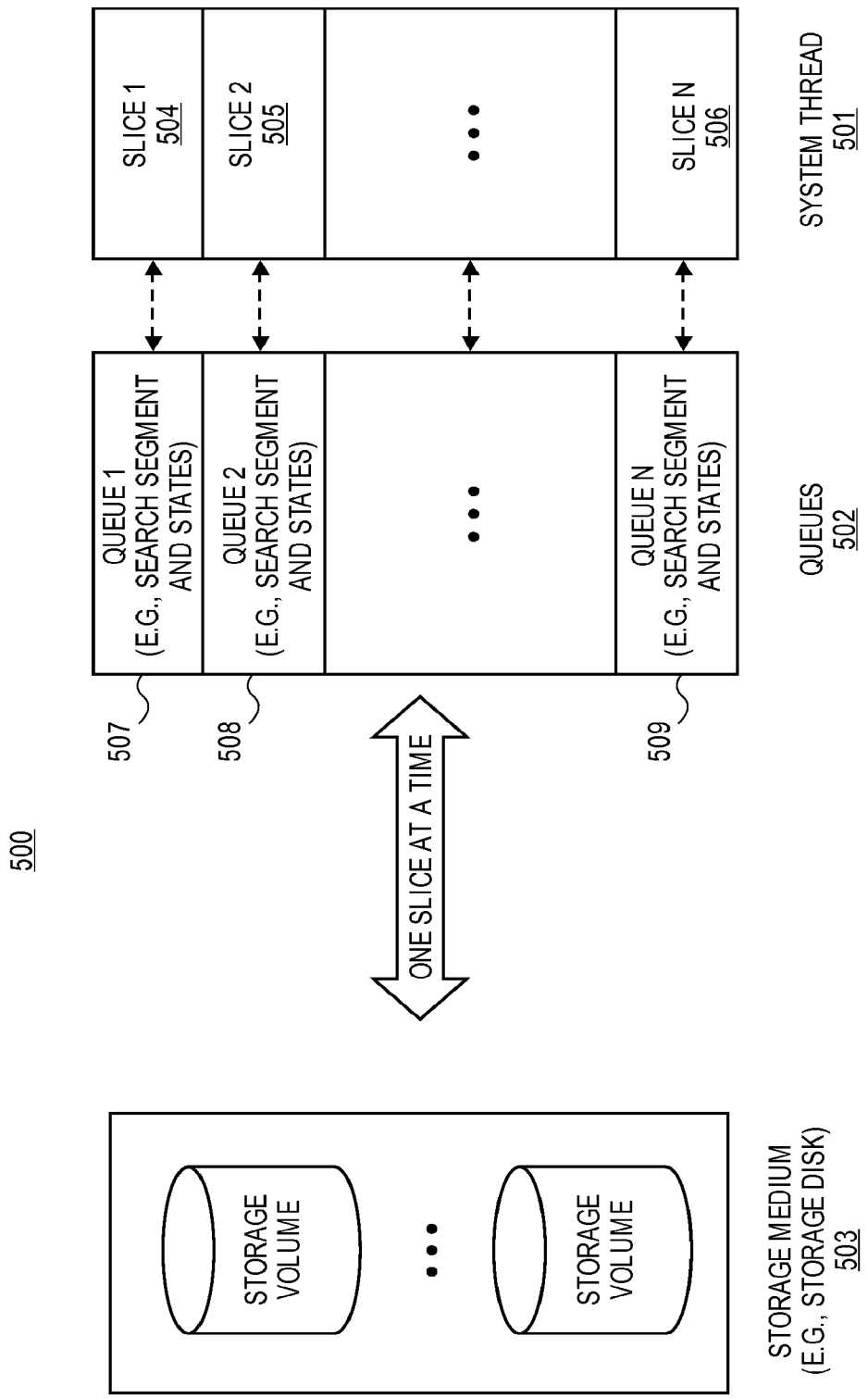
FIG. 5 is a block diagram illustrating an exemplary configuration in which processes for metadata are scheduled according to one embodiment of the invention.

FIG. 5 is a block diagram illustrating an exemplary configuration in which processes for metadata are scheduled according to one embodiment of the invention. For example, configuration 500 may be configured and processed by a scheduler such as schedulers 305 and 306 of FIG. 3. Referring to FIG. 5, configuration 500 includes a system thread 501 which may be time sliced into multiple slices 504-506, each corresponding to a search in storage medium 503 using multiple queues 502 (having queues 507-509), each corresponding to one of the time slices 504-506. For example, system thread 501 may be implemented as part of system thread 315 of FIG. 3 and processes corresponding to time slices 504-506 may be implemented as scheduled processes 317 of FIG. 3. Searches corresponding to slices 504-506 may be performed in a round robin fashion. For each search within a respective time-sliced process (e.g., slices 504-506), at the end of each process, if the corresponding search has not been finished, the operating states and its partial search result may be stored in the corresponding queue (e.g., queues 509). A next process corresponding to a next time slice is executed. Upon a time slice of next round for the incomplete search, the incomplete search is "picked up" again and continues the rest of the search using the previously saved status and partial result.

Figure 6:
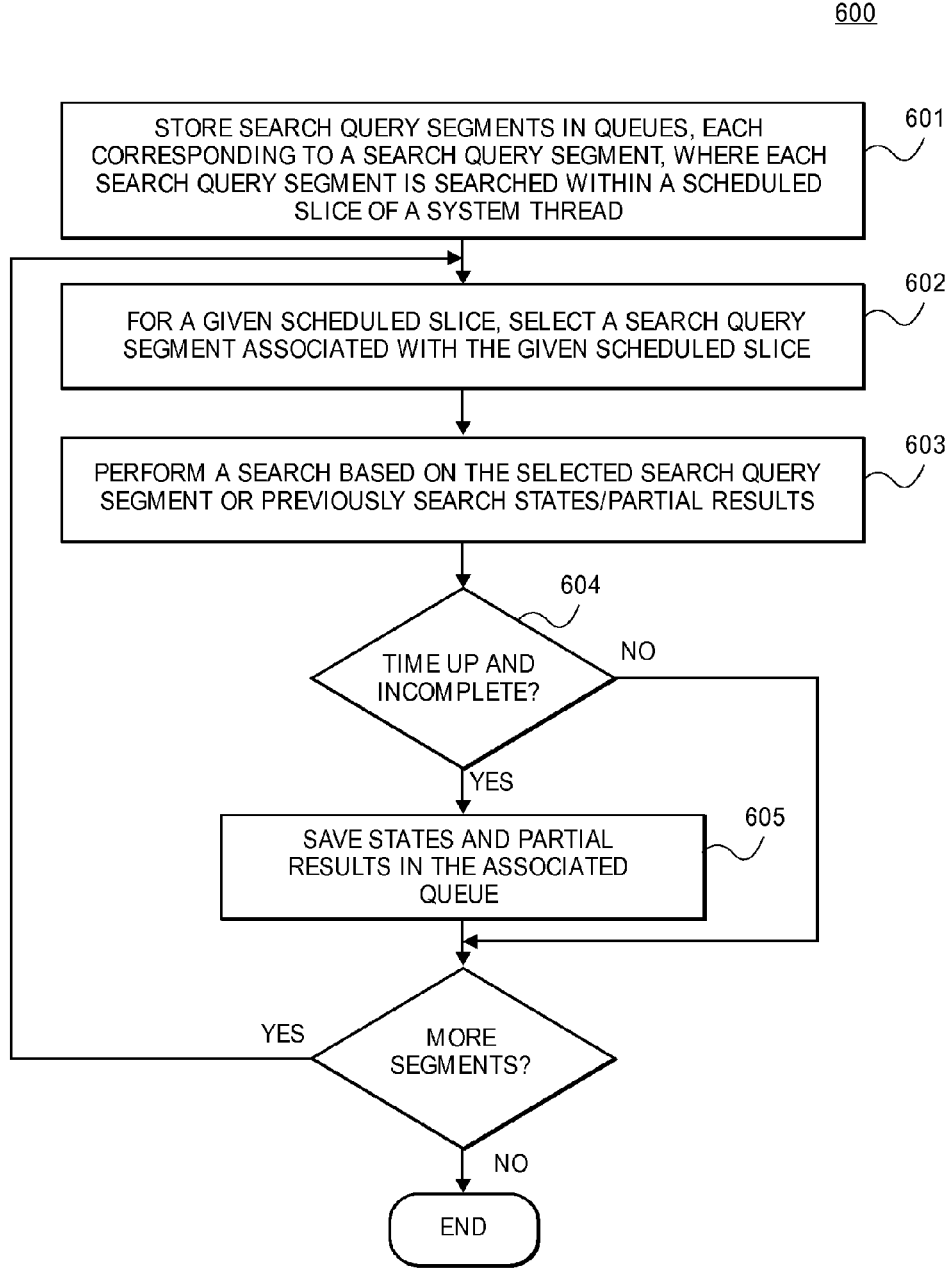
FIG. 6 is a flow diagram illustrating a process for scheduling searches for search queries according to one embodiment of the invention

FIG. 6 is a flow diagram illustrating a process for scheduling searches for search queries according to one embodiment of the invention. Note that process 600 may be performed by a processing logic, which may include software, hardware, or a combination of both. For example, process 600 may be performed by system 500 of FIG. 5. Referring to FIG. 6, at block 601, search query segments are stored in queues e.g., queues 502 of FIG. 5), each corresponding to a segment or a time slice. The search query segments may be divided from a search query by a task manager and/or a store manager as described above. At block 602, for a given time slice (e.g., slices 504-505), a corresponding search query segment is selected, and a search is performed for the selected segment at block 603. At block 604, if time is up before the search is completed, the search states or statuses, as well as the partial results are stored in the associated queue at block 605 (for next round), and a process of a next slice is executed. The above described operations will repeat until all of the searches associated with all time slices are finished. Other operations may also be performed.

Embodiments of Local Optimizations

Figure 7:
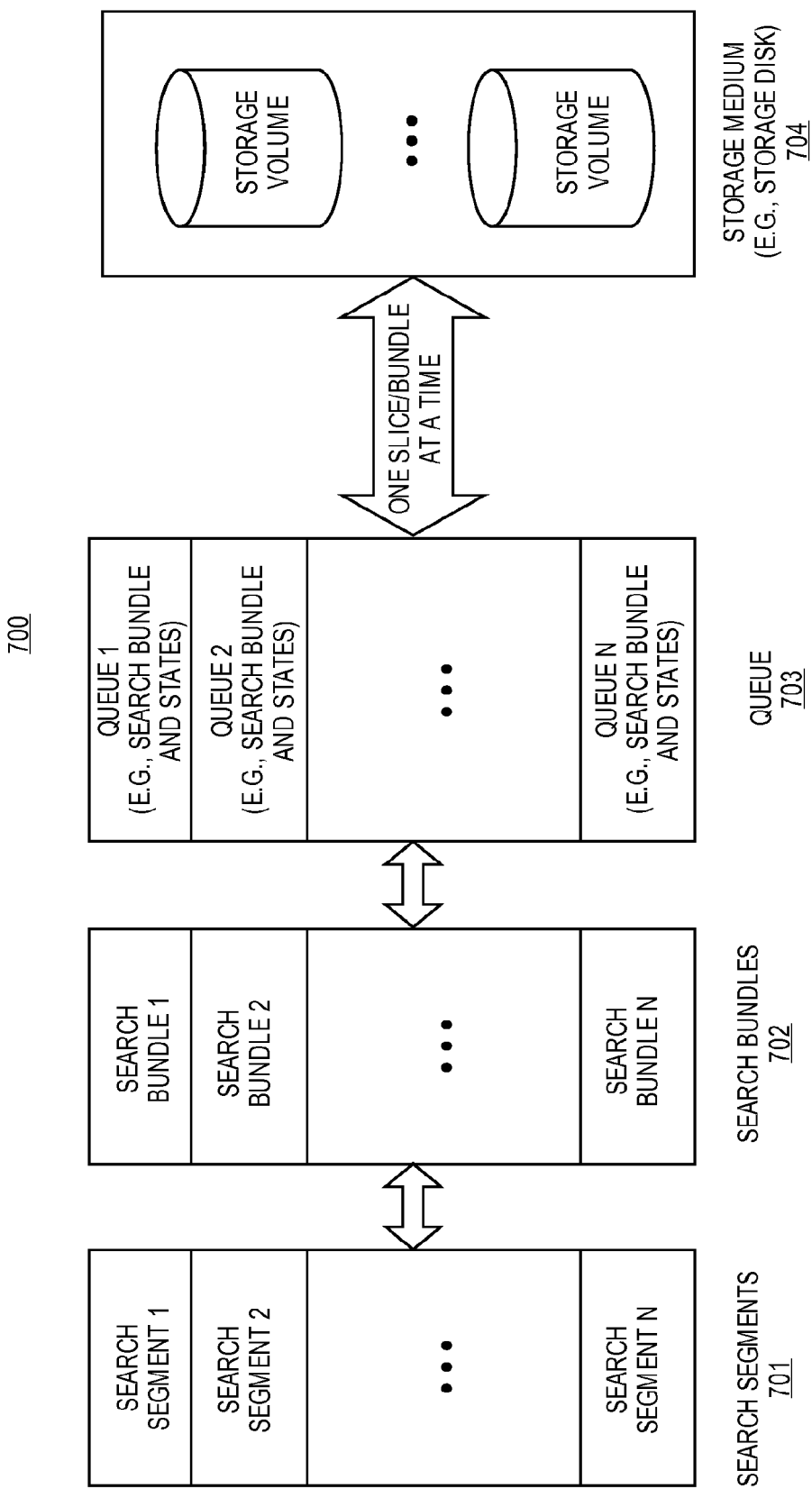
FIG. 7 is a block diagram illustrating an exemplary process for search optimization according to one embodiment of the invention.

Furthermore, according to certain embodiments of the invention, certain local optimizations within a store or storage volume may also be performed. FIG. 7 is a block diagram illustrating an exemplary process for search optimization according to one embodiment of the invention. Referring to FIG. 7, when multiple search query segments 701 are received, some of the search query segments may be grouped into one or more bundles 702. Note that search segments 701 may be generated by partitioning one or more original search queries from one or more clients. Multiple search query segments having similar characteristics or patterns may be grouped into a bundle or a group. For example, some search query segments that will be searched within a proximity of a storage area of a storage volume (e.g., volumes of storage disk 704) may be grouped together to for bundle. Other factors may be considered.

In one embodiment, each bundle may be searched at a time within a time slice allocated per a bundle basis. At the end of each time slice, if the search for the bundle has not been completed, the operating statuses or states may be stored in one of the queues 704 corresponding to the respective bundle, using the techniques described above.

Figure 8:
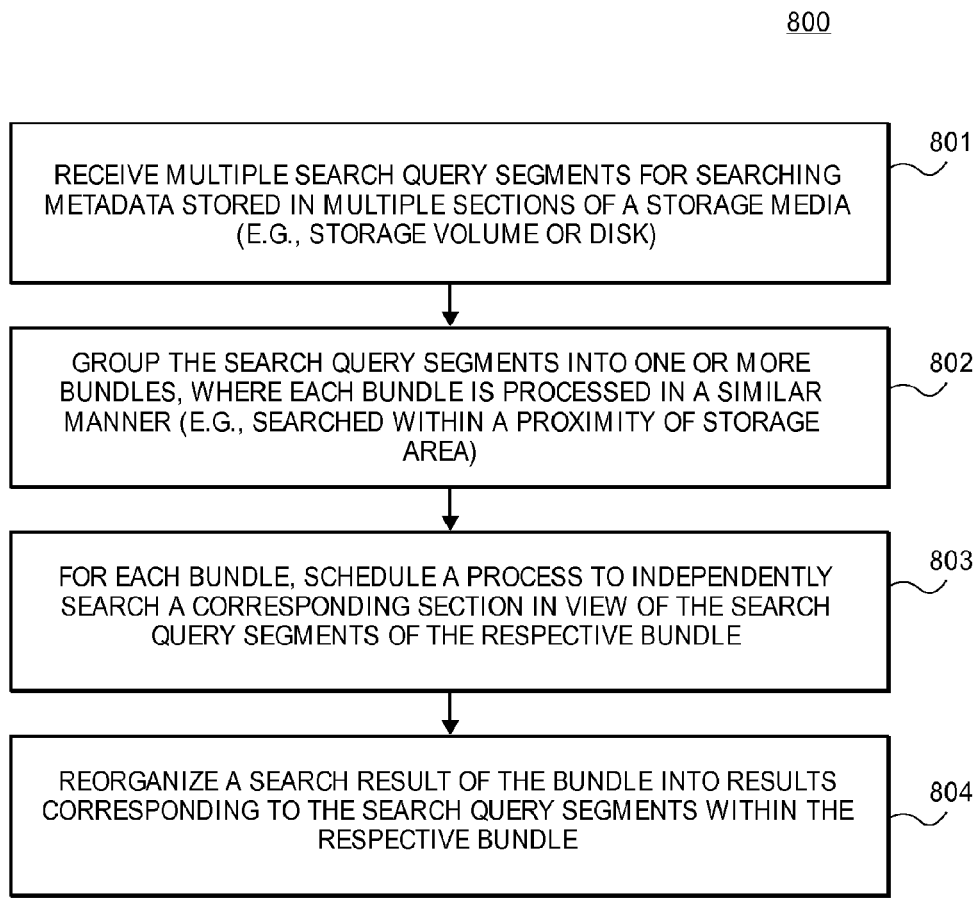
FIG. 8 is a flow diagram illustrating an exemplary process for optimizing metadata searches according one embodiment of the invention.

FIG. 8 is a flow diagram illustrating an exemplary process for optimizing metadata searches according one embodiment of the invention. Note that process 800 may be performed by a processing logic, which may include software, hardware, or a combination of both. For example, process 800 may be performed by system 700 of FIG. 7. In one embodiment, exemplary process 800 may includes, but is not limited to, in response to a first search query for searching metadata, partitioning the first search query into multiple first search query segments, in response to a second search query for searching metadata, partitioning the second search query into multiple second search query segments, and grouping the first and second search query segments into multiple bundles, at least one bundle having at least one first search query segment and at least one second search query segment and search query segments within a bundle having similar characteristics, wherein a search is performed on a per bundle basis.

Referring to FIG. 8, at block 801, multiple search query segments are received for search metadata in a storage medium (e.g., storage volume or storage disk). In one embodiment, such search query segments may be generated from one or more search queries received from one or ore clients and may be partitioned using some techniques described above. At block 802, certain search query segments having similar characteristics may be grouped into one or more groups or bundles, where each bundle is processed in a similar manner (e.g., searched within a proximity of a storage area). At block 803, for each bundle, a process is scheduled to independently search metadata in a storage medium or storage volume. Thereafter, at block 804, the results of all bundles may be reorganized in to a final result suitable to be returned to the client or clients. Other operations may also be performed.

Figure 9A:
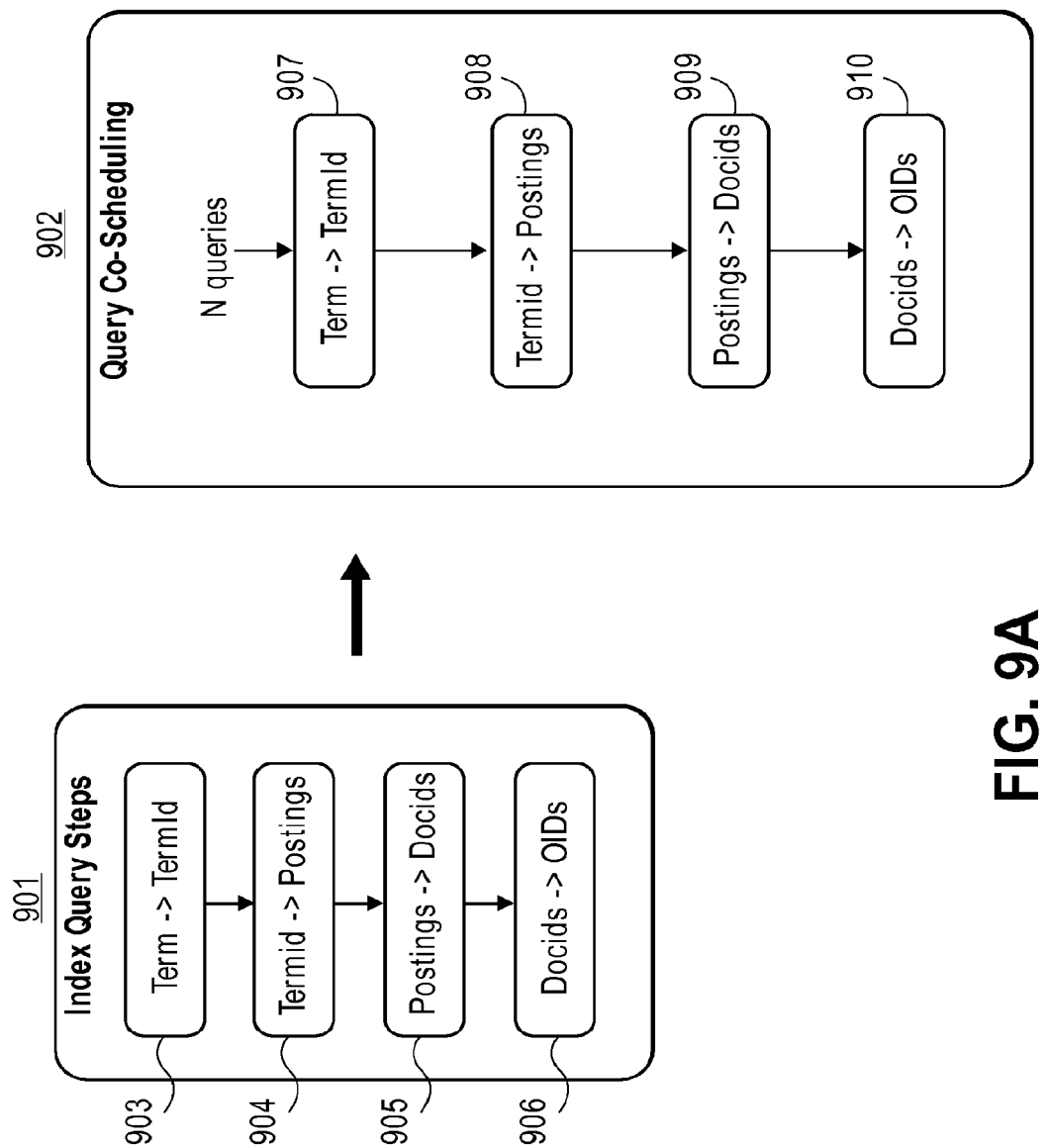
FIGS. 9A-9D are block diagrams illustrating a specific search which may utilize the techniques described above, according to one embodiment of the invention.
Figure 9B:
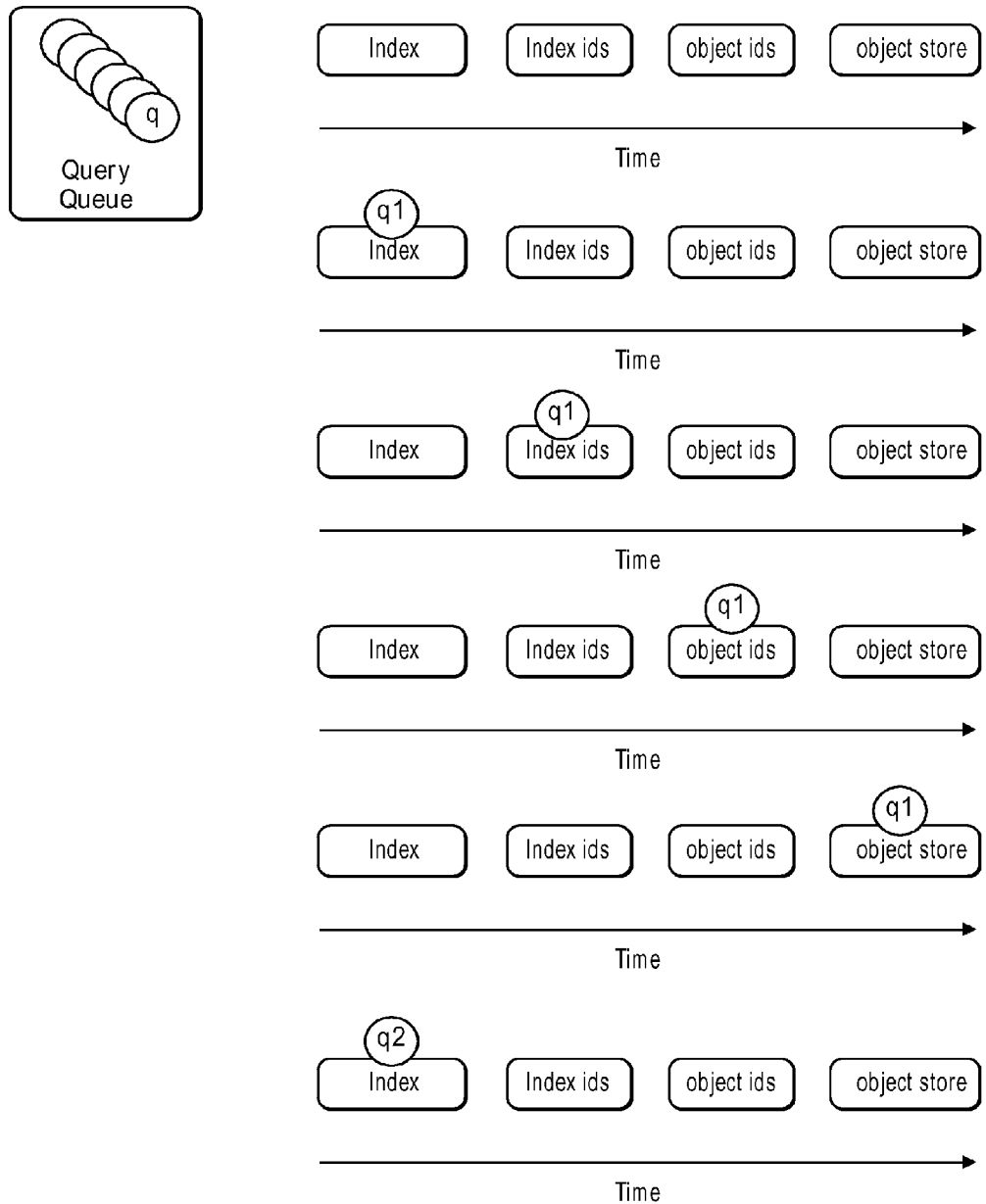

FIGS. 9A-9D are block diagrams illustrating a specific search which may utilize the techniques described above, according to one embodiment of the invention. In this example, as shown in FIG. 9A, a search query or search query segment may be searched across multiple components 903-906 of database 901. For example, when a search query is received at component 903, a search term of the search query is searched in component 903 and mapped into a search term identity (ID). At block component 904, the search term ID is searched and converted into one or more postings (e.g., candidate list of hits). Based on the postings, at component 905, the postings are searched and mapped to the corresponding document IDs. At component 906, the documents IDs are searched and converted into object IDs. Thereafter, based on the object IDs, the attributes or metadata of individual files associated with the object IDs are fetched from a metadata database and returned to the client.

Typically, without the techniques described above, a search for these components 903-906 may require a lock-down on all of these components 903-906, as shown in FIG. 913. As a result, another application or search may not access these components while the search is being conducted.

Figure 9C:
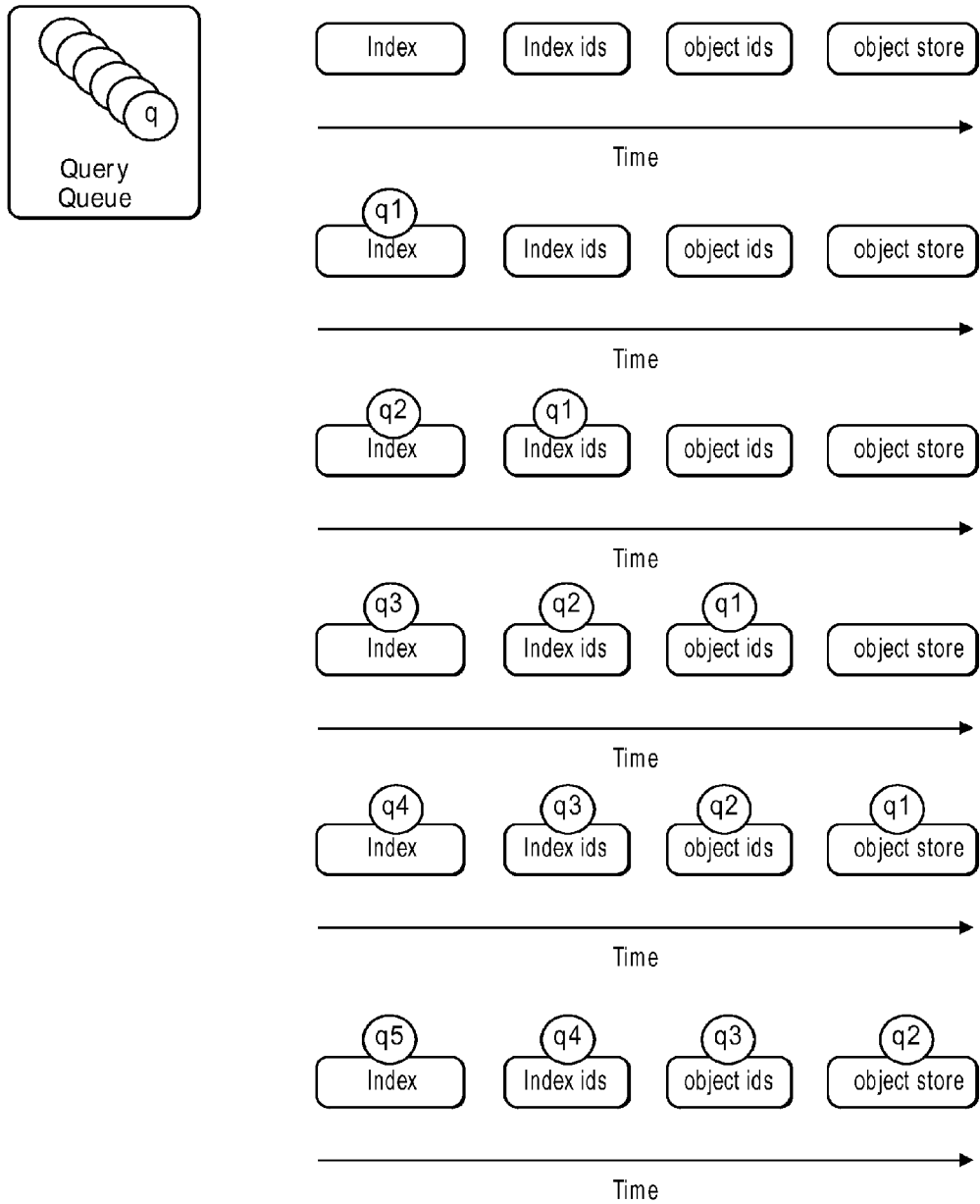
Figure 9D:
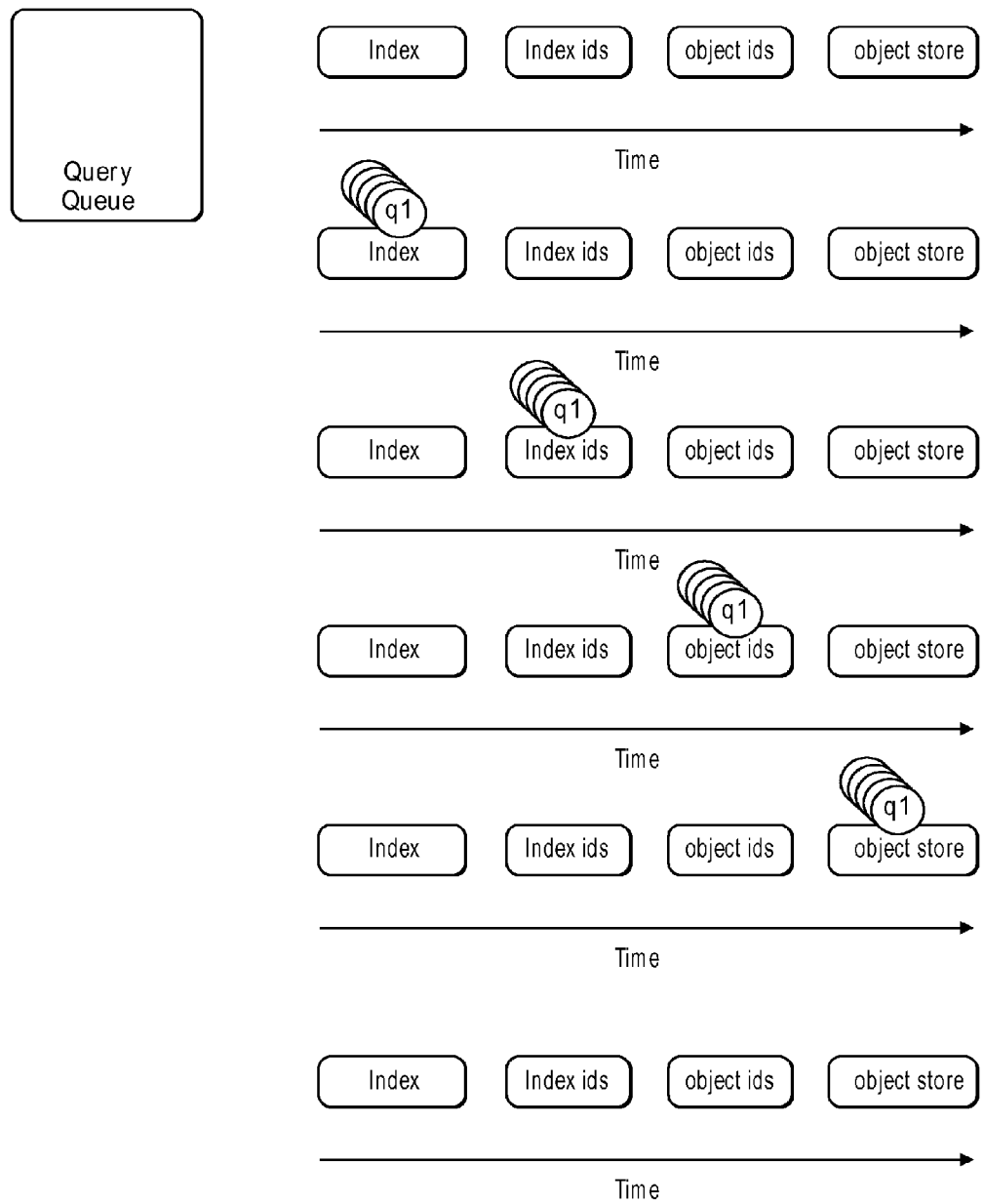

With some or all of the techniques described above, a search query is divided into multiple search query segments each can be scheduled individually and independently. As a result, as shown in index 902 of FIG. 9A, multiple search query components can be substantially concurrently, or pipelined across components 907-910, as shown in FIG. 9C. Further, as described above, certain searches having similar characteristics (e.g., accessing the same or similar storage locations) may be bundled as shown in FIG. 9D. Other configurations may exist.

Embodiments of Communications Mechanisms for Accessing Remote Metadata

Recently, network file accessing protocols, such as, for example, SMB, NFS, DAV, and FTP, have been used to access files of a remote system over a network. However, such protocols are designed to access ordinary file contents. Although, they can be utilized to access certain metadata associated with a file, they are not designed to access other rich sets of metadata, particularly, to search metadata stored in a remote system. According to certain embodiments of the invention, metadata stored in a remote system may be accessed using a dedicated communication channel or tunnel. The dedicated communication channel or tunnel may be established over certain well-defined network file accessing protocols similar to those mentioned above.

Alternatively, the dedicated communication channel or tunnel may be established over certain proprietary file sharing protocols, such as, for example, AFP (AppleShare file protocol) available from Apple Computer of Cupertino, Calif., or SMB (server message block) protocol available from Microsoft Corporation of Redmond, Wash. As a result, metadata accesses can be performed via a dedicated communication channel or tunnel, in parallel with regular file accesses over regular network file accessing protocols, to further improve efficiencies of remote metadata accesses. Note that throughout this application, AFP is utilized as an example of a network file accessing protocol for the purposes of illustration only. It will be appreciated that other protocols may also be applied.

Figure 10:
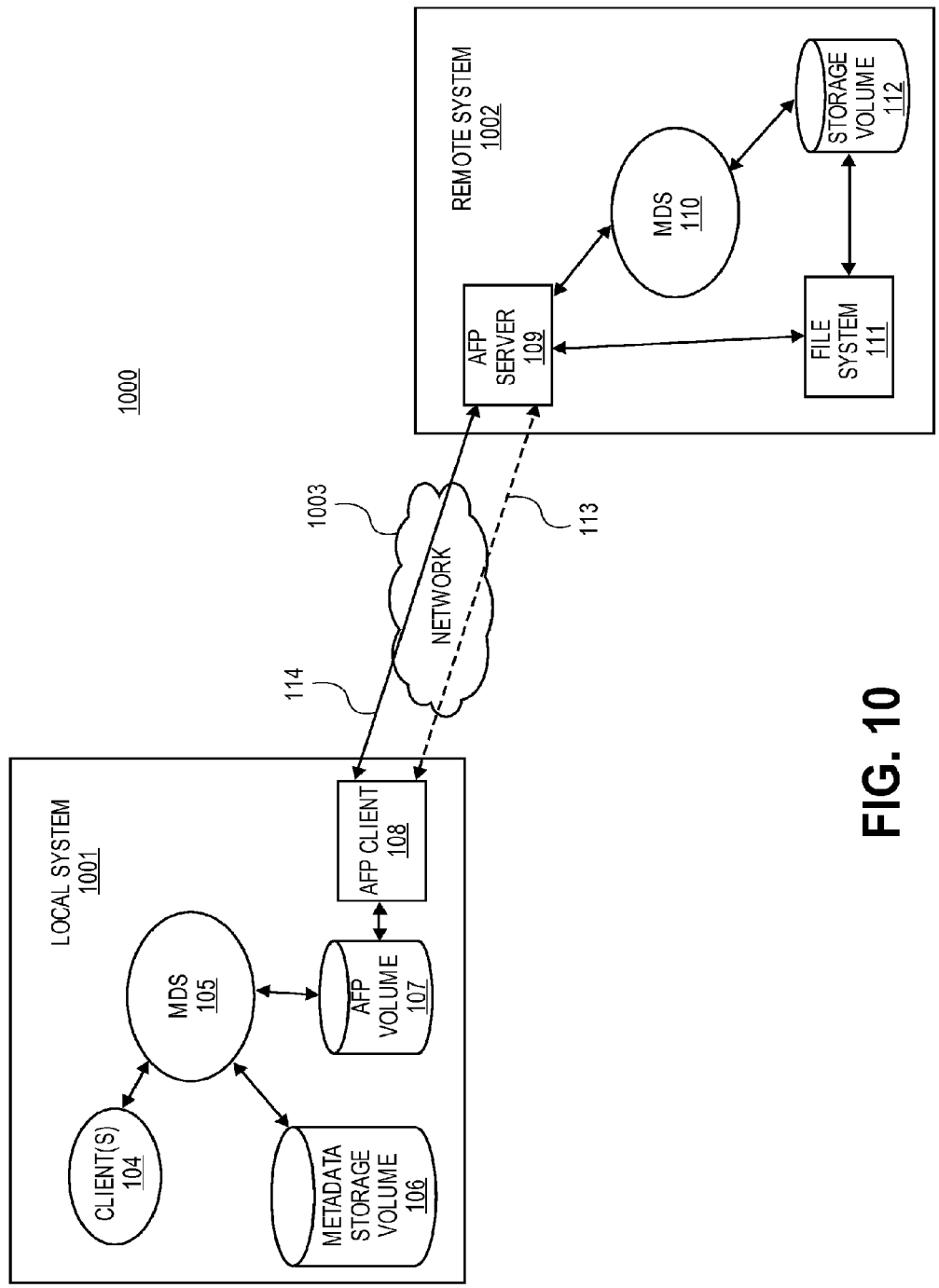
FIG. 10 is a block diagram illustrating a system configuration to access remote metadata using network file accessing protocols according to one embodiment.

FIG. 10 is a block diagram illustrating a system configuration to access remote metadata using network file accessing protocols according to one embodiment. Referring to FIG. 10, exemplary configuration 1000 includes a local system 1001 and a remote system 1002 communicatively coupled to each other over a network 1003, which may be a LAN or WAN. Note that the terms of "local" and "remote" are illustrated in a relative sense rather than an absolute sense. For example, in view of system 1001, system 1002 may be considered as a remote system while system 1001 may be considered as a local system. Likewise, in view of system 1002, system 1001 may be considered as a remote system while system 1002 may be considered as a local system.

In this example, for the purposes of illustration, it is assumed that system 1001 is a local system and system 1002 is a remote system. System 1001 and/or system 1002 may be implemented as a part of system 100 of FIG. 1, system 200 of FIG. 2, and/or system 300 of FIG. 3, etc. Referring to FIG. 10, system 1001 includes one or more clients communicating with MDS 1005 to access metadata stored in a local storage 106 or a remote storage such as storage 112 of system 1002. The remote storage 112 may be mounted as an AFP volume 107 within system 1001 as if it is a local storage volume.

In one embodiment, when the AFP volume 107 is mounted, MDS 105 is notified. In response, MDS 1005 may initiate an AFP client 108 to establish a communication channel 113 (also referred to as an MDS channel or tunnel), in addition to a regular AFP communications 114, where the MDS channel 113 is dedicatedly used to access metadata stored in storage 112 of system 1002. Note that AFP client 108 may be implemented as a part of MDS 105 or alternatively, as a part of a file system or other security components (not shown) of system 1001.

System 1002 includes an AFP server application 109 to handle AFP related communications (e.g., communications 113, 114, or both). For example, information exchanged via the MDS channel 113 may be handled by AFP server 109 and/or MDS 110 to access the metadata stored in storage 112.

Other file contents may be handled by AFP server 109 and file system 111. Note that AFP server 109 may be implemented as a part of MDS 110 or alternatively, a part of a file system 111 or other security components of system 1002.

After the MDS channel 113 has been established, according to one embodiment, AFP client 108 and AFP server 109 may exchange local representation of the paths related to the mounted AFP volume 107 and storage 112. The representation of the paths may be exchanged using channel properties associated with the respective MDS channel to translate the views of the file system paths between a client and a server. For example, in view of system 1001, a path for the AFP volume 107 may be "/Volumes/Public", while a path for the storage 112 in view of system 1002 may be "/Volumes/MyData/Public". As a result, subsequent communications between systems 1001 and 1002 may be mapped to appropriate storage images. Furthermore, a distant store may be a specific store that can be accessed using a plug-in interface via the communication channel, where features of a plug-in interface may be found in the above incorporated by reference co-pending application.

Figure 12:
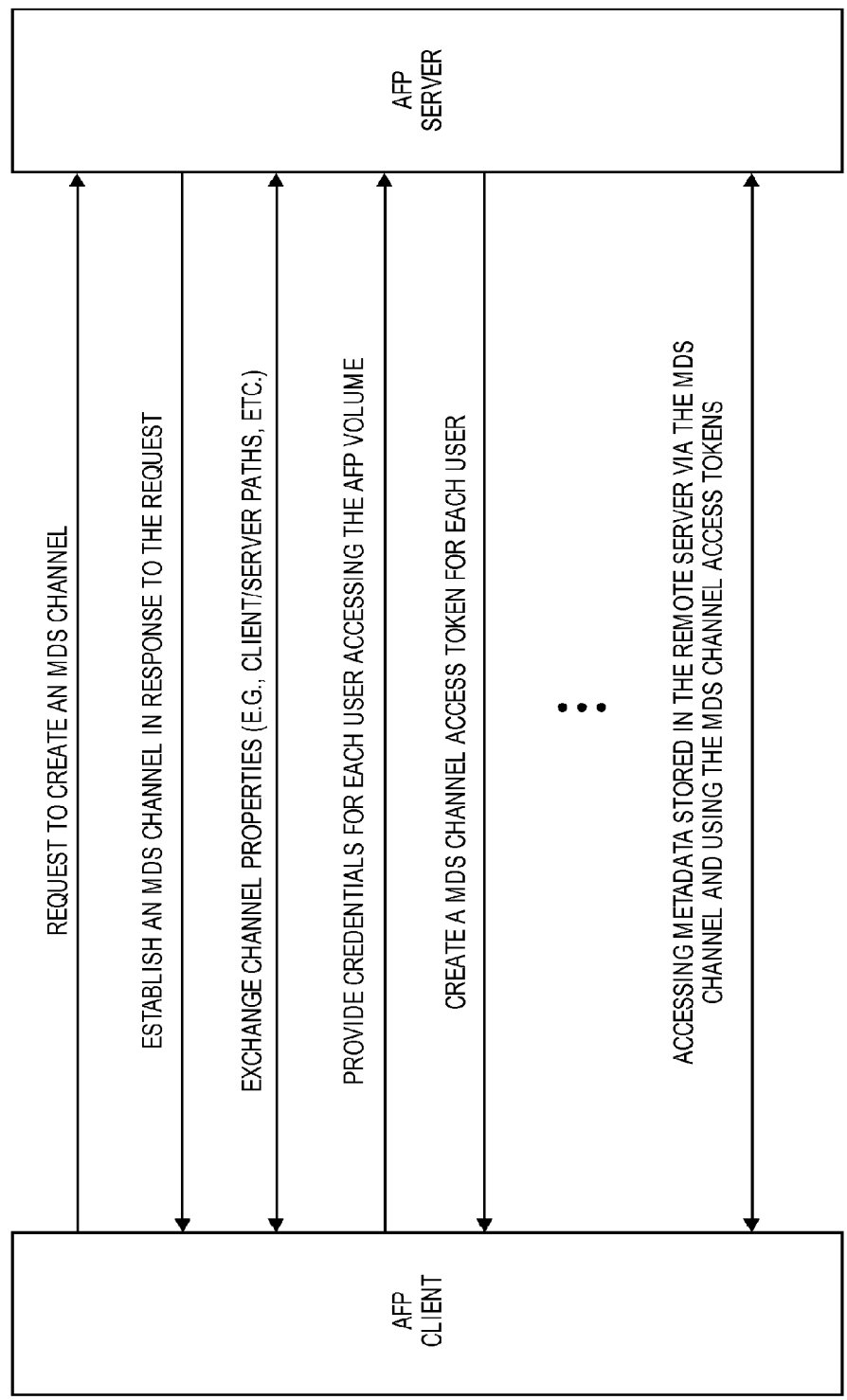
FIG. 12 is a flow diagram illustrating a process for establishing a communication channel to access remote metadata according to one embodiment.

Furthermore, AFP client 108 provides information of the clients 104 to AFP server 109 to establish credentials for clients 104. In response, AFP server 109 creates the requested credentials for clients 104. A credential for a client may further include certain permission to certain metadata stored in storage 112. In addition, AFP 109 may create a MDS channel token for each client that uses the MDS channel 113, such that a client may subsequently access metadata via the MDS channel 113 using the associated MDS channel token. An MDS channel access token may be used to translate views of permissions between a client and a server. For example, an MDS channel access token may include information regarding a permission or privilege of a client for accessing certain metadata stores. A client may only access certain metadata based on a permission or privilege of the client, as described in details in the above incorporated by reference co-pending application. FIG. 12 is a flow diagram illustrating some of the above operations according to certain embodiments.

Figure 13:
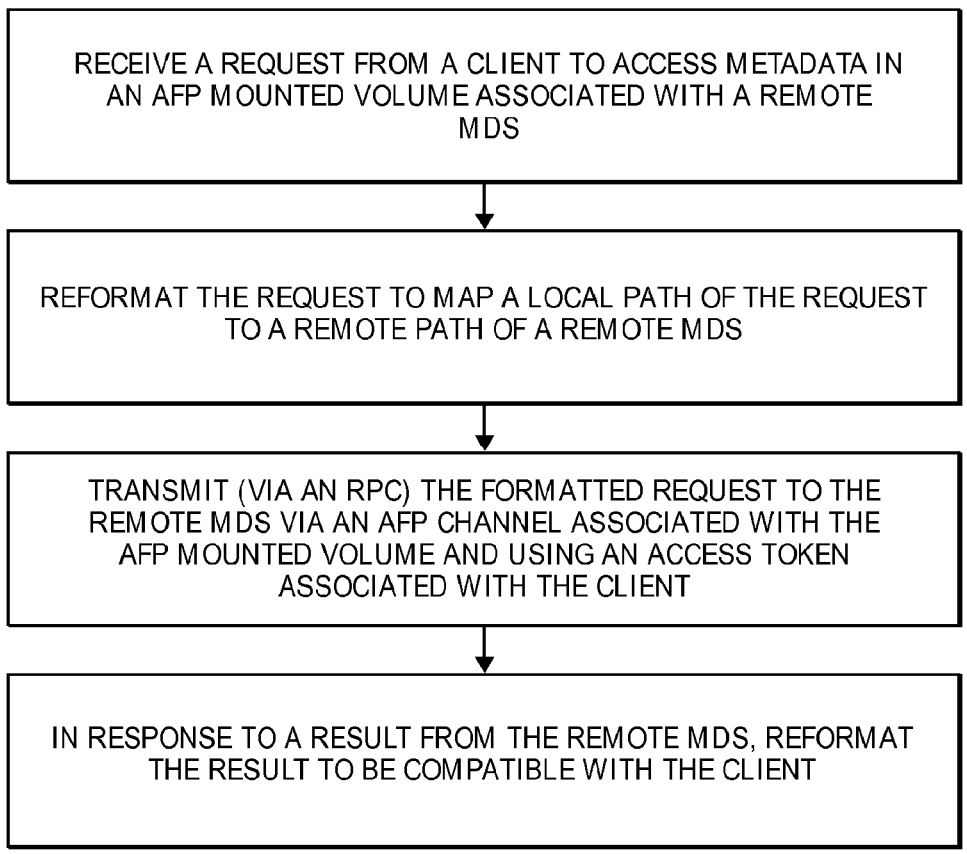
FIG. 13 is a flow diagram illustrating a process for accessing remote metadata via a communication channel according to one embodiment.

In one embodiment, communications conducted within the MDS channel 113 may be carried out via a separate thread (e.g., an RPC or remote procedure call) independently running with respect to normal AFP communications path 114. As a result, the metadata accesses via MDS channel 113 would not substantially block the traffic via normal AFP path 114. In addition, because the MDS channel 113 may be tailored to specific uses for metadata accesses, the metadata accesses may be more efficient, and more metadata, which cannot be accessed via the normal AFP path 114, can now be accessed. Furthermore, communications via an MDS channel may be performed asynchronously. As a result, any metadata updates in an MDS may be substantially instantly "pushed" to a client (e.g., live updates). FIG. 13 is a flow diagram illustrating a process described above according to one embodiment.

Note that although system 1001 is shown as a client system accessing system 1002 as a server, each of the systems 1001 and 1002 may include substantially identical components, such that any one of systems 1001-1002 may serve as a client and a server. For example, in addition to provide metadata access services to system 1001, system 1002 may also be able to access metadata stored in system 1001, using similar techniques described above.

Figure 11:
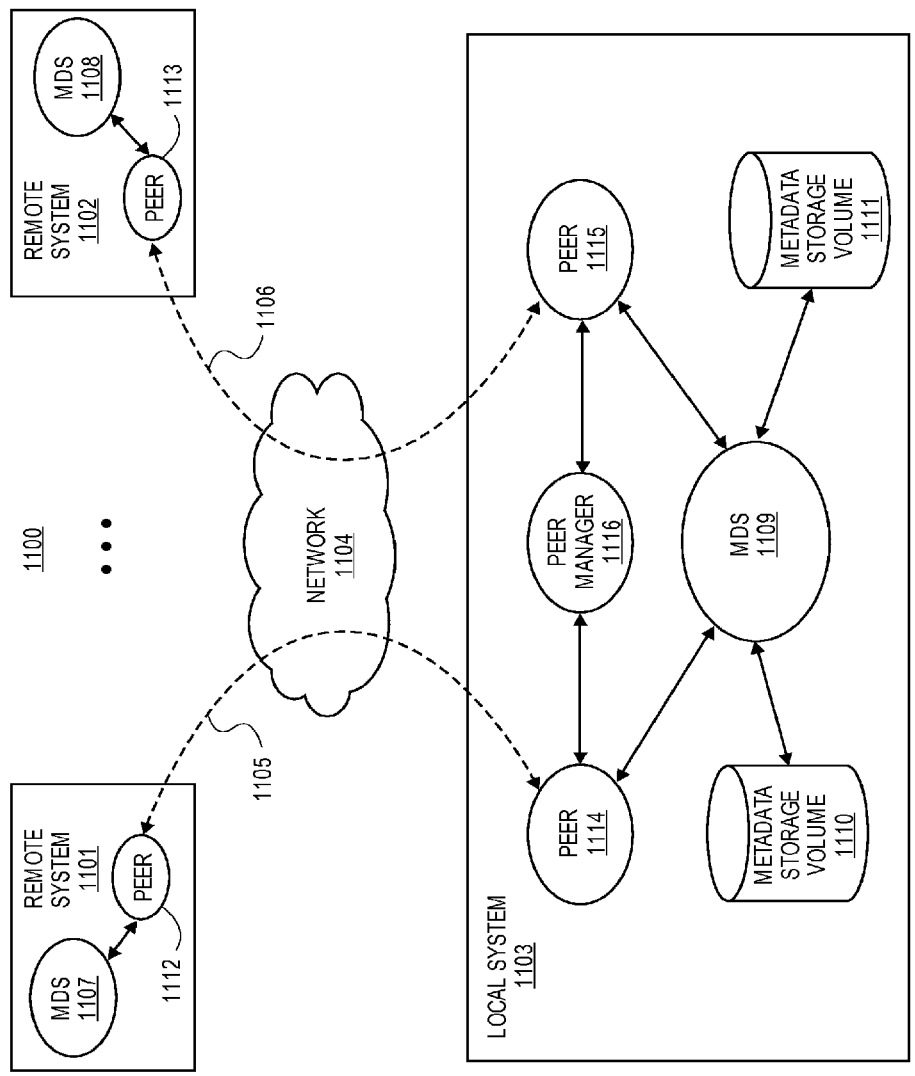
FIG. 11 is a block diagram illustrating a system configuration to access remote metadata using network file accessing protocols according to an alternative embodiment.

FIG. 11 is a block diagram illustrating a system configuration to access remote metadata using network file accessing protocols according to an alternative embodiment. For example, configuration 1100 may be implemented as a part of configuration 1000 of FIG. 10. Referring to FIG. 11, in this example, systems 1101-1103 may be implemented as MDS peers over a network 1104, which may be a LAN or WAN, to access metadata shared by one another.

As described above, each of the peers 1101-1103 may include substantially identical system components, similar those as shown in FIG. 10. For example, systems 1101-1103 include respective MDS components 1107-1109 and peers 1112-1115 for each MDS channel attached to the respective system. For the purposes of illustration only, it is assumed that system 1103 as a server to provide services to systems 1101-1102 as client to access metadata stored in storages 1110-1111. System 1101 communicates with system 1103 via MDS channel 1105 and system 1102 communicates with system 1003 via MDS channel 1106 respectively, using some of the techniques described above. For MDS channels 1105 and 1106, system 1103 includes a peer manager 1116 to initiate respective peer instances 1114-1115 to handle any MDS channel communications for MDS channels 1105-1106 respectively.

In one embodiment, a peer (e.g., peers 1112-1116) is a proxy for a peer MDS process. A peer manager handles service connection requests from peer MDS processes and it manages the lifecycle of a peer instance. A peer is instantiated by the peer manger as peer MDS processes connect and are destroyed when the peer MDS process disconnects. The peer manger is instantiated during MDS startup and is destroyed when MDS is shut down. Thus, when MDS channels 1105-1106 are created, peers 1114 and 1115 are instantiated respectively by peer manager 1116. Likewise, when MDS channels 1105-1106 are destroyed, peers 1114 and 1115 are destroyed respectively by peer manager 1116.

As described above, a peer system can be a client to access other MDS peers as servers, as well as a server to provide MDS services to other MDS peers. As a result, peers 1112-1116 may include both AFP client and server functionalities, similar to those associated with AFP client 108 and AFP server 109 of FIG. 10. Other configurations may exist.

Example of Data Processing System

Figure 14:
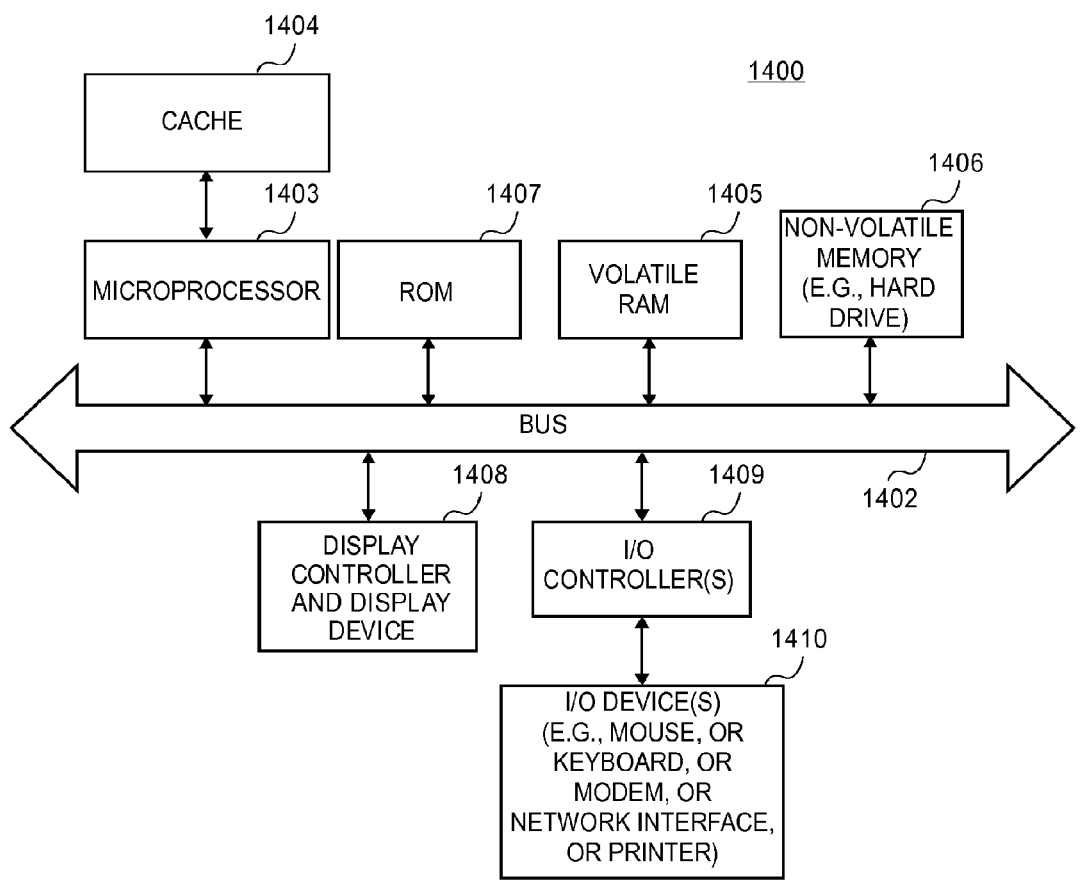
FIG. 14 is a block diagram of a digital processing system, which may be used with one embodiment of the invention.

FIG. 14 is a block diagram of a digital processing system, which may be used with one embodiment of the invention. For example, the system 1400 shown in FIG. 14 may be used as a computer system such as system 100 of FIG. 1. Alternatively, the exemplary system 1400 may be implemented as systems as shown in FIGS. 2-3.

Note that while FIG. 14 illustrates various components of a computer system, it is not intended to represent any particular architecture or manner of interconnecting the components, as such details are not germane to the present invention. It also be appreciated that network computers, handheld computers, cell phones, and other data processing systems which have fewer components or perhaps more components may also be used with the present invention. The computer system of FIG. 14 may, for example, be an Apple Macintosh computer or an IBM compatible PC.

As shown in FIG. 14, the computer system 1400, which is a form of a data processing system, includes a bus 1402 which is coupled to a microprocessor 1403 and a ROM 1407, a volatile RAM 1405, and a non-volatile memory 1406. The microprocessor 1403, which may be, for example, a PowerPC G4 or PowerPC G5 microprocessor from Motorola, Inc. or IBM, is coupled to cache memory 1404 as shown in the example of FIG. 14. Microprocessor 1403 may include multiple processors or multiple core logics (e.g., logical processors). The bus 1402 interconnects these various components together and also interconnects these components 1403, 1407, 1405, and 1406 to a display controller and display device 1408, as well as to input/output (I/O) devices 1410, which may be mice, keyboards, modems, network interfaces, printers, and other devices which are well-known in the art.

Typically, the input/output devices 1410 are coupled to the system through input/output controllers 1409. The volatile RAM 1405 is typically implemented as dynamic RAM (DRAM) which requires power continuously in order to refresh or maintain the data in the memory. The non-volatile memory 1406 is typically a magnetic hard drive, a magnetic optical drive, an optical drive, or a DVD RAM or other type of memory system which maintains data even after power is removed from the system. Typically, the non-volatile volatile memory will also be a random access memory, although this is not required.

While FIG. 14 shows that the non-volatile memory is a local device coupled directly to the rest of the components in the data processing system, the present invention may utilize a non-volatile memory which is remote from the system; such as, a network storage device which is coupled to the data processing system through a network interface such as modem or Ethernet interface. The bus 1402 may include one or more buses connected to each other through various bridges, controllers, and/or adapters, as is well-known in the art. In one embodiment, the I/O controller 1409 includes a USB (Universal Serial Bus) adapter for controlling USB peripherals. Alternatively, I/O controller 1409 may include an IEEE-1394 adapter, also known as FireWire adapter, for controlling FireWire devices.

Thus, methods and apparatuses for searching metadata have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for searching metadata, the method comprising:

in response to a first request received from a first remote metadata store (MDS) peer instance of a first remote peer for accessing metadata stored in a local MDS of a local peer, creating and initiating by a peer manager a first local MDS peer instance to establish a first communications channel with the first remote MDS peer instance to allow the first remote peer accessing the metadata stored in the local MDS of the local peer, wherein the first local MDS peer instance operates as a first proxy for a first peer MDS process specifically for handling the first request for accessing the metadata stored in the local MDS over the first communications channel;

in response to a second request received from a local client of the local peer for accessing metadata stored in a second remote peer, creating and initiating by the peer manager a second local MDS peer instance to establish a second communications channel with a second remote MDS peer instance of the second remote peer to allow the local client accessing the metadata stored in the second remote peer, wherein the second local MDS peer instance operates as a second proxy for a second peer MDS process specifically for handling the second request for accessing the metadata stored in the second remote peer over second communications channel; and managing by the peer manager the first and second communications channels via the first and second MDS peer instances, respectively.

2. The method of claim 1, wherein the peer manager is configured to maintain a plurality of communications channels via a corresponding one of local MDS peer instances for exchanging metadata with a plurality of remote peers, respectively.

3. The method of claim 2, further comprising:
   receiving a first signal from the first remote peer indicating that the first communications channel is no longer needed; and
   in response to the first signal, destroying by the peer manager the first local MDS peer instance to shut down the first communications channel.

4. The method of claim 2, further comprising:
   receiving a second signal from the local client indicating that the second communications channel is no longer needed; and
   in response to the second signal, destroying by the peer manager the second local MDS peer instance to shut down the second communications channel.

5. The method of claim 1, wherein the first local MDS peer instance is configured to operate as an MDS server with respect to the first remote MDS peer instance.

6. The method of claim 5, wherein the second local MDS peer instance is configured to operate as an MDS client with respect to the second remote MDS peer instance.

7. The method of claim 1, wherein creating and initiating the first local MDS peer instance comprises:
   authenticating a first user of the first remote peer based on a first user credential of the first user received from the first remote peer;
   transmitting to the first remote peer a first MDS channel token representing an access permission to a first storage volume associated with the local peer that stores the requested metadata; and
   providing the first user of the first remote peer access of the first storage volume based on the first MDS channel token.

8. The method of claim 1, wherein creating and initiating the second local MDS peer instance comprises:
   transmitting a second user credential of a second user of the local client to the second remote peer to allow the second remote peer to authenticate the second user;
   receiving from the second remote peer a second MDS channel token representing an access permission to a second storage volume associated with the second remote peer; and
   providing the second user access of the second storage volume of the second remote peer based on the second MDS channel token.

9. A non-transitory machine-readable medium having instructions stored therein, which when executed by a machine, cause the machine to perform a method, the method comprising:
   in response to a first request received from a first remote metadata store (MDS) peer instance of a first remote peer for accessing metadata stored in a local MDS of a local peer, creating and initiating by a peer manager a first local MDS peer instance to establish a first communications channel with the first remote MDS peer instance to allow the first remote peer accessing the metadata stored in the local MDS of the local peer, wherein the first local MDS peer instance operates as a first proxy for a first peer MDS process specifically for handling the first request for accessing the metadata stored in the local MDS over the first communications channel;
   in response to a second request received from a local client of the local peer for accessing metadata stored in a second remote peer, creating and initiating by the peer manager a second local MDS peer instance to establish a second communications channel with a second remote MDS peer instance of the second remote peer to allow the local client accessing the metadata stored in the second remote peer, wherein the second local MDS peer instance operates as a second proxy for a second peer MDS process specifically for handling the second request for accessing the metadata stored in the second remote peer over second communications channel; and
   managing by the peer manager the first and second communications channels via the first and second MDS peer instances, respectively.

10. The non-transitory machine-readable medium of claim 9, wherein the peer manager is configured to maintain a plurality of communications channels via a corresponding one of local MDS peer instances for exchanging metadata with a plurality of remote peers, respectively.

11. The non-transitory machine-readable medium of claim 10, wherein the method further comprises:
   receiving a first signal from the first remote peer indicating that the first communications channel is no longer needed; and
   in response to the first signal, destroying by the peer manager the first local MDS peer instance to shut down the first communications channel.

12. The non-transitory machine-readable medium of claim 10, wherein the method further comprises:
   receiving a second signal from the local client indicating that the second communications channel is no longer needed; and
   in response to the second signal, destroying by the peer manager the second local MDS peer instance to shut down the second communications channel.

13. The non-transitory machine-readable medium of claim 9, wherein the first local MDS peer instance is configured to operate as an MDS server with respect to the first remote MDS peer instance.

14. The non-transitory machine-readable medium of claim 13, wherein the second local MDS peer instance is configured to operate as an MDS client with respect to the second remote MDS peer instance.

15. The non-transitory machine-readable medium of claim 9, wherein creating and initiating the first local MDS peer instance comprises:
   authenticating a first user of the first remote peer based on a first user credential of the first user received from the first remote peer;
   transmitting to the first remote peer a first MDS channel token representing an access permission to a first storage volume associated with the local peer that stores the requested metadata; and
   providing the first user of the first remote peer access of the first storage volume based on the first MDS channel token.

16. The non-transitory machine-readable medium of claim 9, wherein creating and initiating the second local MDS peer instance comprises:
   transmitting a second user credential of a second user of the local client to the second remote peer to allow the second remote peer to authenticate the second user;
   receiving from the second remote peer a second MDS channel token representing an access permission to a second storage volume associated with the second remote peer; and
   providing the second user access of the second storage volume of the second remote peer based on the second MDS channel token.

17. A data processing system, comprising:
a processor;
a local metadata store (MDS) for storing metadata; and
a peer manager executed in by the processor, the peer manager configured to
  in response to a first request received from a first remote MDS peer instance of a first remote peer for accessing metadata stored in a local MDS of the data processing system as a local peer, create and initiate a first local MDS peer instance to establish a first communications channel with the first remote MDS peer instance to allow the first remote peer accessing the metadata stored in the local MDS of the local peer, wherein the first local MDS peer instance operates as a first proxy for a first peer MDS process specifically for handling the first request for accessing the metadata stored in the local MDS over the first communications channel,
  in response to a second request received from a local client of the local peer for accessing metadata stored in a second remote peer, create and initiate a second local MDS peer instance to establish a second communications channel with a second remote MDS peer instance of the second remote peer to allow the local client accessing the metadata stored in the second remote peer, wherein the second local MDS peer instance operates as a second proxy for a second peer MDS process specifically for handling the second request for accessing the metadata stored in the second remote peer over second communications channel, and
  manage the first and second communications channels via the first and second MDS peer instances, respectively.

18. The system of claim 17, wherein the peer manager is configured to maintain a plurality of communications channels via a corresponding one of local MDS peer instances for exchanging metadata with a plurality of remote peers, respectively.

19. The system of claim 18, wherein the peer manager is configured to:
  receive a first signal from the first remote peer indicating that the first communications channel is no longer needed; and
  in response to the first signal, destroy the first local MDS peer instance to shut down the first communications channel.

20. The system of claim 18, wherein the peer manager is configured to:
  receive a second signal from the local client indicating that the second communications channel is no longer needed; and
  in response to the second signal, destroy the second local MDS peer instance to shut down the second communications channel.

21. The system of claim 17, wherein the first local MDS peer instance is configured to operate as an MDS server with respect to the first remote MDS peer instance.

22. The system of claim 21, wherein the second local MDS peer instance is configured to operate as an MDS client with respect to the second remote MDS peer instance.

23. The system of claim 17, wherein creating and initiating the first local MDS peer instance comprises:
  authenticating a first user of the first remote peer based on a first user credential of the first user received from the first remote peer;
  transmitting to the first remote peer a first MDS channel token representing an access permission to a first storage volume associated with the local peer that stores the requested metadata; and
  providing the first user of the first remote peer access of the first storage volume based on the first MDS channel token.

24. The system of claim 17, wherein creating and initiating the second local MDS peer instance comprises:
  transmitting a second user credential of a second user of the local client to the second remote peer to allow the second remote peer to authenticate the second user;
  receiving from the second remote peer a second MDS channel token representing an access permission to a second storage volume associated with the second remote peer; and
  providing the second user access of the second storage volume of the second remote peer based on the second MDS channel token.

* * * * *